(12) United States Patent
Nezhad

(10) Patent No.: US 12,461,307 B2
(45) Date of Patent: Nov. 4, 2025

(54) WAVEGUIDES

(71) Applicant: BANGOR UNIVERSITY, Bangor (GB)

(72) Inventor: Maziar Nezhad, Bangor (GB)

(73) Assignee: UNIVERSITY OF SALFORD, Salford (GB)

( * ) Notice: Subject to any disclaimer, the term of this patent is extended or adjusted under 35 U.S.C. 154(b) by 128 days.

(21) Appl. No.: 15/734,380

(22) PCT Filed: Jun. 4, 2019

(86) PCT No.: PCT/GB2019/051549
§ 371 (c)(1),
(2) Date: Dec. 2, 2020

(87) PCT Pub. No.: WO2019/234416
PCT Pub. Date: Dec. 12, 2019

(65) Prior Publication Data
US 2021/0231865 A1 Jul. 29, 2021

(30) Foreign Application Priority Data
Jun. 4, 2018 (GB) ...................................... 1809137

(51) Int. Cl.
G02B 6/02 (2006.01)
G02B 6/122 (2006.01)
G02B 6/124 (2006.01)

(52) U.S. Cl.
CPC ............. *G02B 6/124* (2013.01); *G02B 6/022* (2013.01); *G02B 6/1226* (2013.01)

(58) Field of Classification Search
CPC ...................................................... G02B 6/022
See application file for complete search history.

(56) References Cited

U.S. PATENT DOCUMENTS

| | | | |
|---|---|---|---|
| 6,628,861 B1 * | 9/2003 | Yao | G02B 6/2706 385/24 |
| 6,909,823 B1 | 6/2005 | Sorin | |
| 7,062,126 B2 | 6/2006 | Kersey | |
| 9,715,158 B1 * | 7/2017 | Abel | G02B 6/1225 |
| 2003/0053197 A1 * | 3/2003 | Shigematsu | G02B 6/124 359/333 |
| 2003/0086647 A1 | 5/2003 | Willner | |

(Continued)

FOREIGN PATENT DOCUMENTS

WO    WO-2019212414 A1 * 11/2019

OTHER PUBLICATIONS

Chou, Hui-Min et al; Fabrication and analysis of awl-shaped serpentine microsprings for large out-of-plane Displacement; Journal of Micromechanics and Microengineering; pp. 1-12; 2015.

(Continued)

*Primary Examiner* — Chris H Chu
(74) *Attorney, Agent, or Firm* — Niels Haun; Dann, Dorfman, Herrell & Skillman, P.C.

(57) ABSTRACT

An optical waveguide apparatus for guiding optical radiation therein, comprising a spring defining an optical grating structure with a grating period which is mechanically variable to control the Bloch-mode effective refractive index and/or optical path of at least a part of the optical waveguide in respect of a given frequency of guided optical radiation.

37 Claims, 20 Drawing Sheets

(56) References Cited

U.S. PATENT DOCUMENTS

| | | | | |
|---|---|---|---|---|
| 2016/0185059 A1* | 6/2016 | Kim | .................... | G02B 6/02071 425/150 |
| 2016/0274298 A1* | 9/2016 | Luo | ........................ | G02B 6/124 |
| 2018/0120504 A1* | 5/2018 | Qi | ........................ | G02B 6/3636 |
| 2022/0171105 A1* | 6/2022 | Ko | ........................ | G02B 5/1814 |

OTHER PUBLICATIONS

Halir et al; Waveguide sub-wavelength structures; Laser Photonics Rev. 9, No. 1, 25-49 (2015).

Hsieh, Hsin-Ta et al; Reliability of a MEMS Actuator Improved by Spring Corner Designs and Reshaped Driving Waveforms; Sensors; 2007.

Hung et al ; Serpentine Spring Corner Designs; optical review vol. 12 No. 4; pp. 339-344; 2005.

Ikeda et al; Wavelength selective coupler with vertical gratings on silicon chip; Applied physics Letters 92; 2008.

Kim et al; Flexible polymer waveguide tunable lasers; vol. 18, No. 8 Optics Express; pp. 8392-8399; Apr. 12, 2010.

Krause et al ; A high resolution microchip optomechanical accelerometer; Nature Photonics vol. 6; pp. 768-742; Nov. 2012.

Krishnamoorthya, et al; In-plane MEMS-based nano-g accelerometer with sub-wavelength optical resonant sensor; Sensors and Actuators; pp. 283-290; 2007.

Middlemiss et al; Measurement of the Earth tides with a MEMS Gravimeter; Nature vol. 531; Mar. 31, 2016; pp. 614-629; 2016.

Yaacobi et al; Integrated phased array for wide-angle beam steering; vol. 39, No. 15 Optics Letters; pp. 4575-4578; Aug. 1, 2014.

Zheludev et al; Reconfigurable nanomechanical photonic metamaterials; Nature Nanotechnology vol. 11; pp. 16-22; Jan. 7, 2016.

Berini;Long-range surface plasmon polaritons;Advances in Optics and Photonics 1, 484-588 (2009).

Boltasseva; Integrated Optical Components Utilizing Long-Range Surface Plasmon Polaritons ; Journal of Lightwave technology vol. 23 No. 1 pp. 413-422; Jan. 2005.

Jetté-Charbonneau, Stéphanie et al; Demonstration of Bragg gratings based on longranging surface plasmon polariton waveguides; vol. 13, No. 12 Optics Express; pp. 4674-4682; Jun. 13, 2005.

Nezhad et al; Fabrication techniques for long range surface plasmon waveguides; IEEE; 2007.

Lan Li et al ; Monolithically Integrated Stretchable Photonics ; Changchun Institute of Optics, Fine Mechanics and Physics (CIOMP); Oct. 10, 2017.

Scheuer et al; The Serpentine Optical Waveguide: engineering the dispersion relations and the stopped light points; vol. 19, No. 12 Optics Express; pp. 11517-11528 Jun. 6, 2011.

Mehmet Kahraman et al.; Fabrication and Characterization of Flexible and Tunable Plasmonic Nanostructures; Science Reports; pp. 1-9; Dec. 2, 2013.

International Search Report-Written opinion dated Aug. 19, 2019 in Application No. PCT/GB2019/051549.

Matthias Bohm et al.; Mechanical tuning of plasmon resonances in elastic, two-dimensional gold-nanorod arrays; vol. 7, No. 61 Optical Materials Express; pp. 1882-1897; Jun. 1, 2017.

OPtics and Photonics, Guided Wave Optical Components and Devices, K. Porsezian and K. Senthilnathan, Academic Press, Chapter 15 pp. 233-242, Optical Fiber Gratings K. Thyagarajan and Chapter 17 Solitons in a Fiber Bragg Grating, K. Porsezian pp. 251-280, 2006.

* cited by examiner (a)

(b)

WAVEGUIDES

PRIORITY APPLICATIONS

This application is a 371 application of International Application No. PCT/GB2019/051549 filed Jun. 4, 2019, which claims priority to United Kingdom Patent Application No. 1809137.1 filed Jun. 4, 2018. Each of the foregoing applications is hereby incorporated herein by reference.

FIELD

The present invention relates to waveguides, particularly optical waveguides. The invention relates to, for example, waveguides the optical properties of which are tuneable by action of a mechanical force.

BACKGROUND

The field of photonics is strongly influenced by the availability of platforms having suitable material properties which determine important parameters such as wavelength of operation, loss, gain and dispersion. Recourse to engineering artificial materials (so-called 'meta-materials') on the nanoscale has been an effective approach for creating new photonic materials with properties that can be drastically different compared to the original material used to fabricate the meta-material. Examples of meta-materials include birefringent stratified materials, and negative index meta-materials. A major effort in photonics research is directed towards finding new materials and architectures that can provide optical tunability. In one approach the properties of the bulk material itself are changed (e.g., liquid crystals and carrier injection) while other methods of involve mechanical movement of macro-scale optical components (e.g., a MEMS actuated mirror).

Other methods use a combination of these techniques (e.g., temperature tuning, which changes physical size and refractive index). At a fundamental level, in all of these methods optical tuning is universally achieved through the physical movement and/or rearrangement of material mass. This can range from the movement of macroscopic objects (as in the case of the moving mirror), down to the re-distribution of sub-atomic particles (such as electrons in a carrier injection tuning scheme). Each tuning method has its own characteristic properties such as tuning range, tuning speed and energy consumption. For example, thermal tuning can provide a reasonably large tuning range at the expense of having to maintain a heating current flow which requires constant energy expenditure. Some tuning methods are suitable for high speed chip-scale guided wave scenarios (e.g., carrier injection) while others (such as electrostatic MEMS tuning) are more energy efficient and can provide a larger tuning range, at the expense of lower tuning speed.

The invention aims to address these matters.

SUMMARY

According to the present invention there is provided an apparatus and method as set forth in the appended claims. Other features of the invention will be apparent from the dependent claims, and the description which follows.

At its most general, the present invention provides an optical waveguide the optical properties of which are tuneable by action of a mechanical force which changes a periodicity of the spatial distribution of the material (i.e. refractive index) of the waveguide. A spatially periodic refractive index may provide an optical grating structure defining a grating vector. The waveguide may be arranged to guide or diffract light in certain directions depending on the direction of the grating vector. The material forming the waveguide may be continuously distributed within the length of the waveguide, as a series of successive grating ridges joined by anti-symmetrically successive connecting links. This continuous distribution of material may periodically traverse/cross the direction of the grating vector. The continuous distribution of material forming the waveguide may meander or wind across the direction of the grating vector while simultaneously progressing in a direction along the direction of the grating vector. The continuous distribution of material forming the waveguide may form a spring in shape and in mechanical function.

Accordingly, light guided by the waveguide is not guided within the confines of the continuous distribution of material of the waveguide, by total internal reflection therein, but is instead guided by a process of constructive interference of light diffracted from periodically successive parts of the continuous distribution of material of the waveguide. Thus, the periodic spatial distribution of the material (i.e. refractive index) of the waveguide may define a photonic crystal. The photonic crystal may possess a photonic bandgap. By providing a continuous distribution of the material of the waveguide, each periodically successive part of the continuous distribution is mechanically coupled to each of the other such parts (e.g. as in a spring).

The waveguide may provide a broadly tuneable, electro-opto-mechanical platform based on structured (e.g. nano-structured) material (e.g. dielectric material, metal or metallic material, or a meta-material) forming a waveguide. The waveguide may be used for photonic and mechanical coupling in switching, sensing or inertial measurement systems. Implementation of the waveguide may be in materials such as silicon, silicon nitride, nano-crystalline diamond, or III-V (semiconductor type) optical gain materials. The waveguide may be employed in a laser (e.g. a nano-laser), a nonlinear photonic device, or an integrated electro-opto-mechanical chip with broad tuneability. The waveguide may operate at optical wavelengths within, and between, the mid-Infra-red (IR) region and/or the far-IR region of the optical spectrum, or within the visible or the ultraviolet optical spectrum, depending upon the material used and/or the period of the waveguide.

The waveguide may be compatible with chip-scale integrated photonics. It may be operated at wavelengths across a wide spectrum. It may provide an extremely large tuning range with very low energy consumption. As a result of these characteristics, the waveguide may be employed in optical communications, mid- and far-infrared sensing, gas sensing, nano-opto-mechanics and inertial navigation systems.

Optical principles relevant to the invention will now be described, to allow a better understanding of the invention.

When light travels along the length of an optical waveguide formed to have a lengthwise periodic refractive index, the behaviour of the guided light may be described accurately using the Bloch-Floquet formalism. Guided light propagating along the length of the waveguide acquires a periodicity and adopts a so-called Bloch-Floquet optical mode of the periodic waveguide structure. These optical modes are analogous to the modes adopted by an electron moving in a periodic crystal lattice which are familiar to solid-state physics. Indeed, such a lengthwise periodic optical waveguide is commonly referred to as an example of a "photonic crystal" for these reasons.

Propagation of a Bloch mode along a lengthwise periodic waveguide having a period/pitch equal to $\Lambda_G$ along the z dimension (e.g., FIG. 1(a)), can be expressed as:

$$E(x,y,z) = E_B(x,y,z) \exp(-\gamma_B z)$$

Here $E_B(x,y,z)$ is the periodic electric field distribution of the Bloch mode within a given period of the waveguide ($E_B(x,y,z+\Lambda_G) = E_B(x,y,z)$), and $\gamma_B$ is the complex propagation constant of the mode. This constant can be expressed as:

$$\gamma_B = \alpha_B + ik_B$$

where $k_B = 2\pi n_e/\lambda_0$ is propagation constant and op is the amplitude attenuation constant of the Bloch mode. The quantity $n_e$ is the effective refractive index of the Bloch mode, and $\lambda_0$ is the free-space wavelength guided light within the waveguide.

The behaviour of a periodic waveguide of a given period $\Lambda_G$ is strongly dependent upon the frequency ω, or equivalent free-space wavelength $\lambda_0$, of the light guided within it and its value compared to $\Lambda_G$. Assuming a cladding index $n_c$, three main domains can be defined (FIG. 2):

Domain (1): When $\Lambda_G < \lambda_0/2n_e$, then scatter-free, lossless wave-guiding occurs. This is termed the subwavelength regime.

Domain (2): When $\lambda_0/2n_e < \Lambda_G < \lambda_0/(n_e + n_{clad})$ then contra-directional Bragg reflection back into the waveguide happens (within the span of the photonic bandgap). There is no free space scatter until domain 3 (below) is reached.

Domain (3): When $\Lambda_G > \lambda_0/(n_e + n_{clad})$ then part of the propagating wave scatters into free space at angles determined by the grating period, the effective and cladding refractive indices and the free space wavelength.

In this way, by mechanically varying the period or pitch of the periodic optical waveguide, one may selectively access each of these three regimes.

In a first aspect, the invention may provide an optical waveguide apparatus for guiding optical radiation therein, including a spring comprising a plurality of spring periods collectively defining an optical grating structure with a grating period which is mechanically variable to control the Bloch-mode effective refractive index of, and/or optical path length in, at least a part of the optical waveguide in respect of optical radiation guided across the spring periods along the optical waveguide. In this way, by mechanically changing the length of spring periods within the waveguide, one may change the spatial distribution of the material of the waveguide through which, and between which, guided light passes as it is guided along the waveguide. The optical properties of the waveguide structure change as a result of this.

For example, for a given length of the waveguide, the volumetric proportion of that length containing material of the spring (e.g. filled by parts of the spring), relative to the corresponding volumetric proportion not containing material of the spring (e.g. between parts of the spring), may be controllably changed e.g. by stretching, compressing or otherwise deforming the spring along that length. Light guided by the waveguide though both volumetric parts as a whole (i.e. within the material of spring elements and between such material/elements) thereby experiences a controllably changeable Bloch-mode effective refractive index, and/or optical path length in, for the given length of the waveguide. Both the volumetric parts of the waveguide between spring elements and the volumetric parts filled by spring elements, each provide a part of the overall optical path of guided light propagating along the waveguide in use.

The optical waveguide apparatus may include an actuator arranged to mechanically apply to the spring any one or more of: a strain; a flexure; a torsion; thereby to vary the grating period along at least a part of the optical waveguide.

The actuator may be arranged to mechanically apply to the spring any one or more of: a compressive strain; a tensile strain; a torsional strain.

The actuator may be arranged to apply the strain to elongate the spring (or at least splay or stretch one or more spring periods) or to compress the spring (or at least one spring period) thereby to increase or decrease, respectively, the effective optical path length of the Bloch mode.

The material of the string may be a mechanically brittle material. By brittle, it is meant that fracture of the material occurs substantially at/when the elastic limit of the material is passed, when considered in an engineering stress-strain diagram. This ensures that plastic deformation is avoided (i.e. the material is not ductile). Such deformation is undesirable as it reduces the reversibility/repeatability of the mechanical variability of the grating period of the spring. The value of the fracture strain of the material of the spring may be substantially the same value as the value of the ultimate strain of the material of the spring. The actuator may be arranged to apply the strain so that the strain value is not greater than the value of the corresponding ultimate strain of the material of the spring. In this way, the actuator is arranged on synergy with the properties of the spring to allow reversibility/repeatability of the response of the spring to the application of tuning forces by the actuator. This aims to avoid plastic deformation in the spring.

This provides for improved reversibility/repeatability of the response of the spring to the application of tuning forces by the actuator. The fracture strain of the material of the spring may have a value of at least 0.1%, or at least 0.5%, or at least 1%, or at least 2%, or at least 3%, or at least 5%, or at least 6%, or at least 7%, or at least 8%, or at least 9%, or at least 10%. The fracture strain of the material of the spring may have a value in the range 1% to 25%, or in the range 1% to 15%, or in the range 1% to 10%, or in the range 1% to 5%, or in the range 2% to 8%, or in the range 3% to 7%. These values may be fracture strains when considered in an engineering stress-strain diagram. To determine the value of a fracture strain, one may preferably apply international standard ISO 6892.

The Young's modulus of the material of the spring may be less than 1200 GPa, or may be less than 600 GPa, or may be less than 200 GPa, or may be less than 100 GPa. For example, the Young's modulus of the material of the spring may be less than 1 GPa for polymer materials. For example, the Young's modulus of the material of the spring may be in the range 25 GPa to 100 GPa (e.g. 59 GPa for gold, or 70 GPa for InP). For example, the Young's modulus of the material of the spring may be in the range 200 GPa to 1200 GPa (e.g. 1100 GPa for diamond). The Young's modulus of the material of the spring may be in the range 110 GPa to 200 GPa (e.g. for Si). Preferably, international standard ASTM E2769-16 may be used to measure the Young's Modulus of the material.

The longitudinal spring constant of the spring, in respect of loads applied in a direction along the longitudinal axis of the spring, may vary depending upon the shape and dimensions of the spring employed. A suitable upper limit on the value of the spring constant is determined by the Young's modulus of the material of the spring as well as the shape and dimensions of the spring employed. Purely as an illustrative example, when the material of the spring is silicon, the spring may be dimensioned and structured so that its spring constant does not exceed 10 N/m, or does not exceed 5 N/m, or does not exceed 3 N/m. Similarly, when the material of the spring is silicon, the spring may be dimensioned and structured so that its transverse spring constant of the spring, in respect of loads applied in a direction transverse to the longitudinal axis of the spring, may be such that it does not exceed 2 N/m, or does not exceed 1 N/m, or does not exceed 0.5 N/m. These values have been found to be effective is enabling a high degree of tuning range and sensitivity because a relatively small mechanical tuning force provides a relatively large variation in the grating period of the waveguide structure.

The value of the grating period may be a value between $\lambda_0/50$ and $10\lambda_0$, where $\lambda_0$ is the free-space wavelength of light which the waveguide is arranged to guide. The shape of the meandering, winding or curving of the 'wire' (or 'beam') of the spring defines the bulk spring shape, whereas the dimensions (e.g. width and height) of the spring wire itself define the quantity of the material of the spring present within each period of the waveguide. The width of the spring wire, as measured along the dimension of the spring parallel to the longitudinal axis of the waveguide, may be such that it does not exceed 100, or does not exceed $5\lambda_0$, or does not exceed $2.5\lambda_0$, or does not exceed $\lambda_0$, or does not exceed $\lambda_0/5$, or does not exceed $\lambda_0/10$, or does not exceed $\lambda_0/50$. The value of $\lambda_0$ may be a value between 0.1 μm and 100 μm, inclusive. The height of the spring wire, along the dimension of the spring transverse to the longitudinal axis of the waveguide, may be such that it does not exceed $10\lambda_0$, or does not exceed $5\lambda_0$, or does not exceed $2.5\lambda_0$, or does not exceed $\lambda_0$, or does not exceed $\lambda_0/5$, or does not exceed $\lambda_0/10$, or does not exceed $\lambda_0/50$. The width of the waveguide, as defined by the shape of the meandering, winding or curving of the 'wire' of the spring in the dimension transverse to the longitudinal axis of the waveguide, may be such as to not exceed 10 μm, or may be such as to not exceed 5 μm, or may be such as to not exceed 2.5 μm, or may be such as to not exceed 2 μm, or may be such as to not exceed 1.5 μm.

The spring may be planar and each grating period may reside substantially in the plane of the waveguide. The spring may be a serpentine spring. The meanders of the spring may be substantially coplanar, e.g. when the spring is in the quiescent state not subject to deformation. Each spring period may comprise rectangular, triangular, semi-circular or other shapes of meander paths in the spring. Each spring period may comprise a meander having a meander length along the longitudinal axis of the spring (e.g. a connecting link), and a meander width transverse to the longitudinal axis of the spring (e.g. grating ridges). Span beam/wire segments may span the meander width and connector beam/wire segments or links may connect successive span beam segments along the meander length (e.g. in an anti-symmetric manner). Either one of, or both of, the span beam segments and the connector beam segments may be substantially linear, or curved. Span beam segments may be arranged to meet connector beam segments to define a convex corner. The convex meander corner may be filleted. Filleting has been found to improve the stress/strain performance of the spring.

The spring may be formed comprising a material which is a substantially brittle material whereby the ultimate strength of the material of the spring is substantially equal to the breaking strength of the material of the spring. The spring may be formed from a polycrystalline material, or formed from a semiconductor material. In other examples, the spring may be formed from a metal or a polymer.

The spring may comprise a plurality of tuning stubs extending from (e.g. outwardly) the spring in a direction transverse to the longitudinal axis of the waveguide. The tuning stubs may be coplanar with the plane of the spring when the spring is a planar (e.g. serpentine) spring. Provision of tuning stubs has been found to encourage the radiation of guided light out from the waveguide transversely from the waveguide. The tuning stubs may be dimensioned such that length of successive tuning stubs varies according to the position of the tuning stub along the axial length of the spring. The lengthening of a tuning stub has been found to have the effect of increasing the efficiency with which it promotes radiation of guided light out from the waveguide, in use. This has been found to be effective in controlling the distribution of light radiated from the waveguide along the length of the spring.

The grating period of the grating structure of the waveguide may be arranged to vary along at least a part of the axial length of spring thereby to produce chirped grating structure.

The optical waveguide apparatus may include a tuning controller arranged to control the value of the grating period to control the spectral position of a photonic band gap of the optical waveguide. It has also been found that controlling the length of the aforementioned tuning stubs, when incorporated into the spring, has the effect of controlling the spectral width of a photonic band gap of the optical waveguide. Thus, the spectral position of a photonic band gap of the waveguide may be tuned as desired, and the width of the band gap may be chosen by providing tuning stubs on the spring structure and suitably dimensioning their length.

Accordingly, in a second aspect, the invention may provide an optical spectrometer comprising an optical waveguide apparatus as described above.

In a fourth aspect, invention may provide any of the following: an accelerometer comprising an optical waveguide apparatus as described above; a tuneable period Bragg grating comprising an optical waveguide apparatus as described above; an optical interferometer comprising an optical waveguide apparatus as described above; an optical phase modulator comprising an optical waveguide apparatus as described above; an optical dispersion compensator comprising an optical waveguide apparatus as described above; an optical coupler (e.g. a directional coupler) comprising at least one (or a plurality of) optical waveguide apparatus as described above; an optical beam former comprising at least one (or a plurality of) optical waveguide apparatus as described above.

The invention may provide an optical waveguide system including a plurality of waveguides apparatuses according to the invention in its first aspect. Two or more of the waveguides thereof may be mutually optically coupled, e.g. such as to provide an optical coupler.

The invention may provide an optical beam former comprising a plurality of optical waveguide apparatuses as described above, in which a plurality of said springs are arranged successively side-by-side with respective longitudinal axes mutually in parallel and substantially coplanar to define a substantially planar array of said springs. At least one of, and preferably each of, the successive springs possesses one or more tuning stubs disposed along the axial length thereof to define an optically radiating planar array.

The optical beam former may comprise a plurality of tuning stubs, in which at least one tuning stub spans the planar array so as to be a tuning stub common to at least two (or all) successive said side-by-side springs thereby to define an optically radiating planar array.

In a third aspect, the invention may provide a plasmonic waveguide apparatus for guiding surface plasmons thereon, comprising: a spring comprising a plurality of spring periods collectively defining an optical grating structure with a grating period which is mechanically variable to control the Bloch-mode effective refractive index, and/or optical path length in, of at least a part of the plasmonic waveguide in respect of a given frequency of surface plasmon guided across the spring periods along the optical waveguide.

The term 'about' when used in this specification refers to a tolerance of ±10%, of the stated value, i.e. about 50% encompasses any value in the range 45% to 55%, In further uses or embodiments, 'about' refers to a tolerance of ±5%, ±2%, ±1%, ±0.5%, ±0.2% or 0.1% of the stated value.

BRIEF DESCRIPTION OF DRAWINGS

For a better understanding of the invention, and to show how embodiments of the same may be carried into effect, reference will now be made, by way of example only, to the accompanying diagrammatic drawings in which.

DESCRIPTION OF EMBODIMENTS

Figure 1:
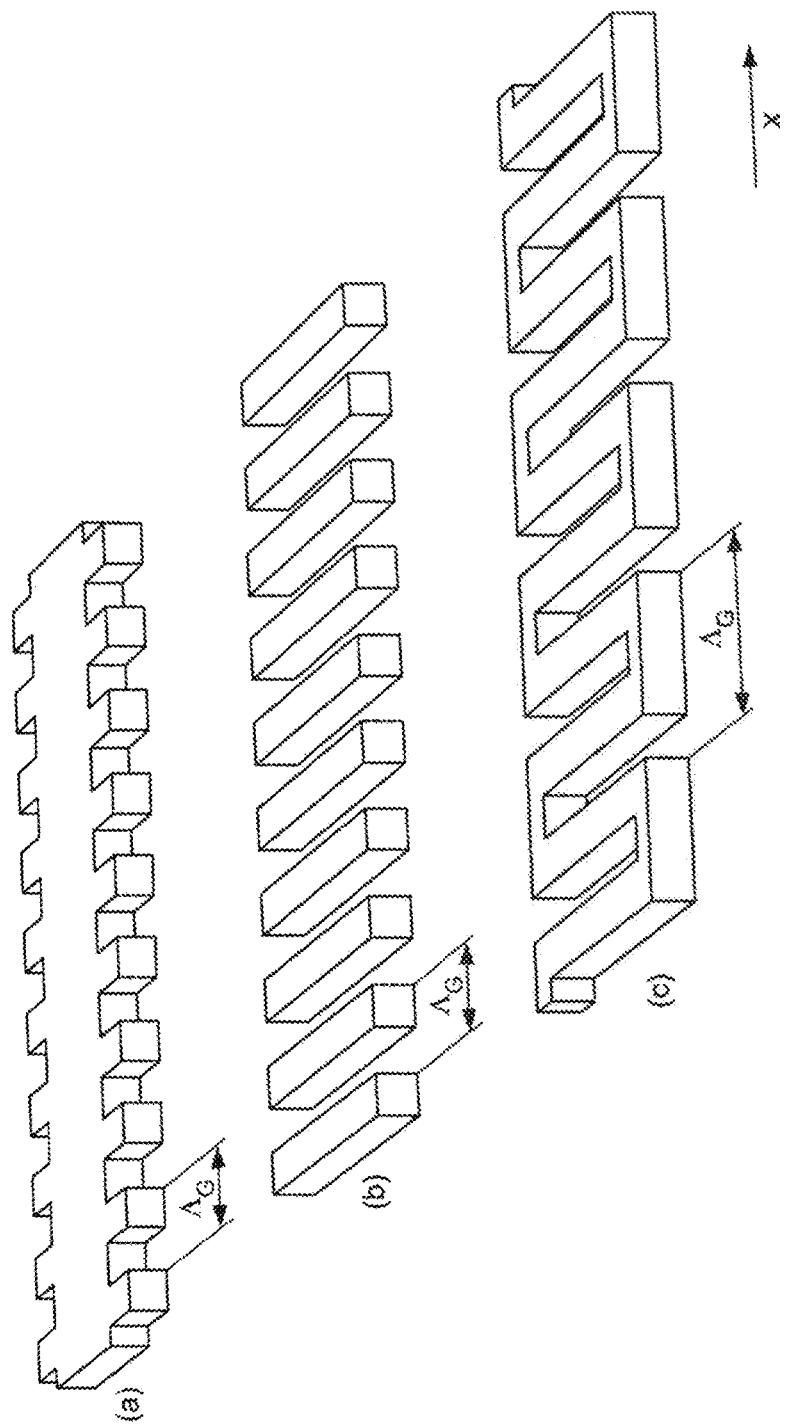
FIG. 1(a) illustrates an optical waveguide defining an optical grating structure within a longitudinally continuous body of waveguide material along the guiding axis of the waveguide.
FIG. 1(b) illustrates an optical waveguide defining an optical grating structure within a longitudinally discontinuous body of waveguide material along the guiding axis of the waveguide.
FIG. 1(c) illustrates an optical waveguide defining an optical grating structure in the form of a serpentine spring which is a mechanically continuous body of material presenting a periodically discontinuous distribution of waveguide material along the guiding axis of the waveguide.

A new tunable integrated photonics platform based on flexible optical waveguides that can operate across the UV, visible or infrared regions of the spectrum is presented here. The approach can be used for any optical waveguide material system but it is particularly suitable for brittle and inflexible materials such as crystalline and polycrystalline semiconductors and amorphous glasses. The flexibility of the waveguide stems from its geometric shape, which is in the form of a serpentine spring. The mechanical flexibility of the waveguide allows the realisation of widely tunable optical devices using micromechanical actuation techniques. This allows for the coupling of mechanical motion or mechanical forces to photonic signals, enabling mechanically tuneable photonic devices or integrated photonics force and motion sensing systems.

The waveguide can operate in three main regimes, governed by the relative size of the free-space wavelength of guided light and the spring period. When the period of the spring is chosen to be smaller than the free-space wavelength divided by twice the Bloch effective index, scatterless guidance of a photonic Bloch mode will ensue. This is suitable for use in a tunable interconnect or a phase modulator. When the period of the spring is larger than the free-space wavelength divided by the sum of the Bloch effective index and the cladding index, part of the guided wave will scatter into free space. This is suitable for use in a tunable optical grating and in a tunable guided wave surface scatterer such as used in LIDAR applications. In between these two regimes lies a regime where guidance with no free space scattering happens but a contra-directional backscattered beam will also exist. This is suitable for use in a tunable reflective waveguide device, such as a guided wave Bragg reflector.

The waveguide platform according to preferred embodiments of the invention, is based on the opto-mechanical properties of a flexible structure in the form of a serpentine spring. serpentine spring structures in the micrometer size range have been used extensively in MEMS devices as mechanical supports, for example to create suspended micro-mirrors, however the focus here is on sub-wavelength spring structures. To introduce the concept, first consider a periodically corrugated Bragg waveguide (also known as a photonic crystal waveguide) with a core refractive index of n, a cladding index of $n_{clad}$ and grating period of $\lambda_G$. For the purposes of this discussion the waveguide is assumed to support only one transverse mode. The photonic Bloch mode at free space wavelength $\lambda_0$ guided by this waveguide will exhibit free space and/or contra-directional scattering if $\Lambda_G > \lambda_0/2n_e$. In the region immediately above $\Lambda_G = \lambda_0/2n_e$, free space scattering is inhibited but a backward scattered guided mode still exists, resulting in a photonic band gap centred at a wavelength of $\lambda_0 = 2n_e\Lambda_G$. However, once the period is reduced so that $\Lambda_G < \lambda_0/2n_e$, the structure will behave as a lossless, non-scattering waveguide for wavelengths below the photonic band edge.

FIG. 1(a) illustrates an optical waveguide comprising a continuously linear dielectric waveguide strip with small, regular crenellations extending from opposite longitudinal edges of the strip along its length direction (X). The crenellations repeat with a special period $\Lambda_G$ to define an optical grating structure with a grating vector pointing in the length direction (X) of the waveguide. FIG. 1(b) shows an alternative arrangement for an optical grating structure in an optical waveguide in which dielectric material is entirely removed from between successive crenelations of the optical waveguide of FIG. 1(a) to result in a periodically repeating linear array of separated, parallel dielectric rungs. Despite the dielectric rungs being physically separate, their periodicity ($\Lambda_G$) promotes a way guiding of light along the direction (X) of the grating vector of the structure.

With this background, let us now consider the serpentine periodic spring structure shown in FIG. 1(c). This structure is created by providing connecting links between the grating ridges of an optical grating structure illustrated in FIG. 1(b), in an antisymmetric manner, instead of simply symmetrically filling in the central space between grating ridges as in FIG. 1(a). This is still a periodic structure, however adding the antisymmetric connecting links results in doubling of the period. If the period of this new structure (consisting of a full 'S' period) is reduced below $\lambda_0/2n_e$ it will provide a lossless, non-scattering photonic waveguide structure. Thus this provides a flexible spring structure that can guide a photonic Bloch mode in a lossless manner. This generic spring structure, comprising grating ridges connected anti-symmetrically by connecting links (of which FIG. 1(c) is just one example), will be referred to hereafter as a Flexible and Extensible (FLEX) waveguide.

FIG. 1(c) shows an optical waveguide according to an embodiment of the invention comprising a serpentine mechanical spring formed from a continuous serpentine length of dielectric spring wire of rectangular cross section. The spring wire meanders across and along the direction of the longitudinal length of the waveguide. Successive parallel fringe sections of the spring wire meander in directions at right angles across the longitudinal axis of the waveguide to collectively define an optical grating structure in which each such parallel meander defines a grating fringe. Successive such parallel fringe sections of spring wire are joined by a longitudinal connecting section of the spring wire meander in a direction parallel to the longitudinal axis of the waveguide. Successive such connecting sections are disposed in anti-symmetric fashion at opposite edges of the waveguide and defined successive reverse turns in the direction of meander of the spring wire. The grating period ($\Lambda_G$) of the serpentine spring optical grating is greater than the period of the fringe sections of the waveguide, and includes the connecting sections between fringe sections.

Figure 3:
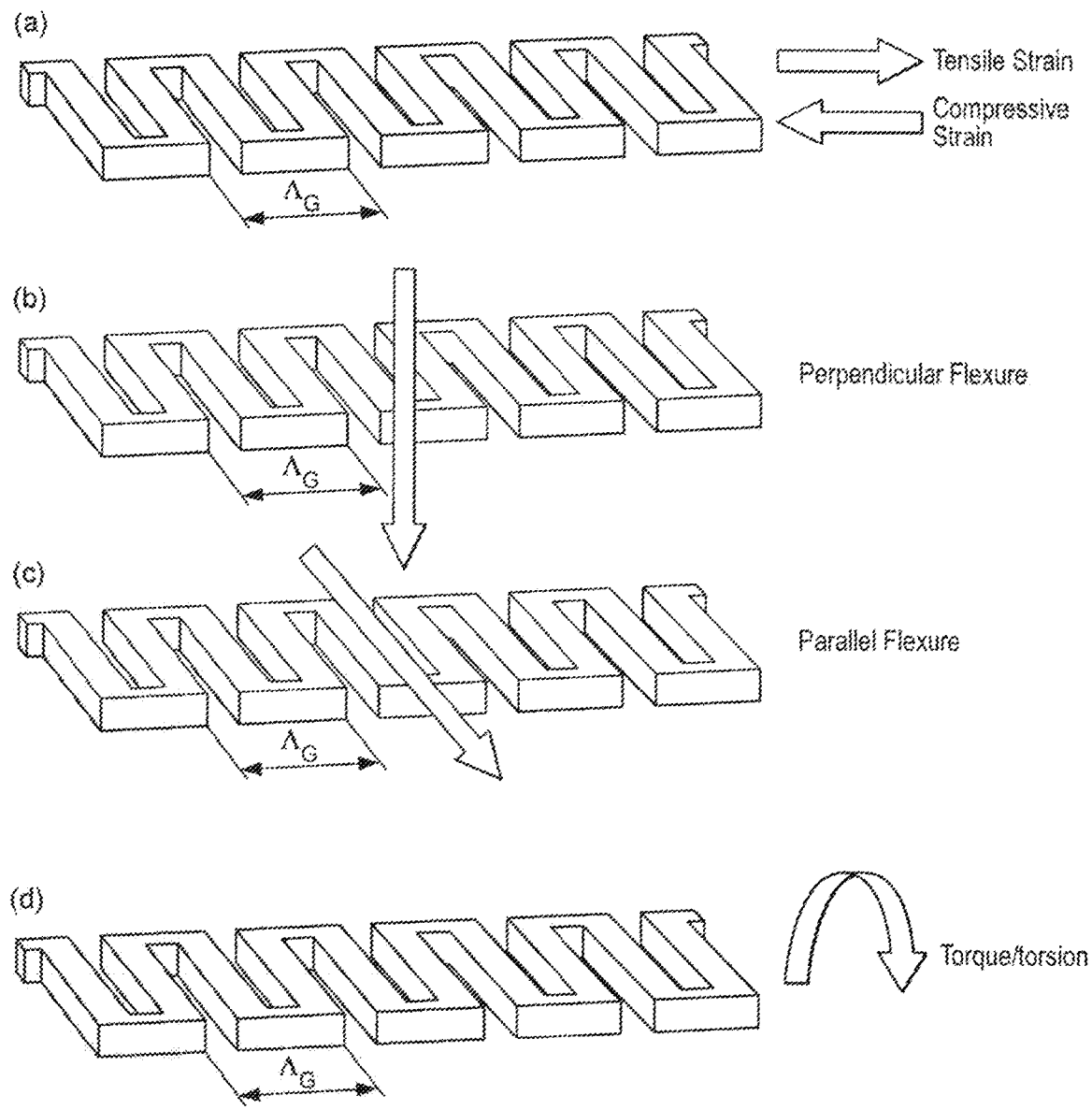
FIG. 3(a) schematically illustrates the direction of application of tensile and compressive strain to a waveguide of FIG. 1(c)
FIG. 3(b) schematically illustrates the direction of application of plane-perpendicular flexure force to a waveguide of FIG. 1(c)
FIG. 3(c) schematically illustrates the direction of application of plane-parallel flexure force to a waveguide of FIG. 1(c)
FIG. 3(d) schematically illustrates the direction of application of a torque/torsion force to a waveguide of FIG. 1(c)

FIG. 3 shows the serpentine spring optical waveguide of FIG. 1(c) and schematically illustrates the direction of deformations to which the spring is responsive, in use, by changing the size of its grating period either to increase or decrease.

If a tensile force is applied to the spring, its spring period will increase as a result. Therefore, the physical optical distance travelled by the Bloch mode will increase (with no scattering losses, as long as the sub-wavelength condition is maintained).

On the other hand, the effective index of the waveguide will also decrease due to the reduction of the amount of waveguide core material per unit length. This effect can be conceptualized by considering an extremely elongated spring, which is a nearly straight thin narrow wire. This latter effect will serve to reduce the effective optical path, in opposition to the physical path increase.

However, as the computer simulations described below will demonstrate, the former effect (path lengthening) will dominate. As a result, applying tensile force to elongate the spring will result in an overall increase in the effective optical path length travelled by the Bloch mode. In other words, this structure functions as a mechanically actuated guided-wave optical phase modulator or optical delay line. Alternatively, one can also view this structure as a photonic strain gauge, where the applied force can be measured by tracking the optical phase shift of the guided wave.

Such a FLEX structure is highly flexible from a mechanical viewpoint. In addition, optionally using brittle materials such as silicon will allow the structure to repeatably revert to its original configuration.

FIG. 3(a) indicates applicable tensile forces directed along the longitudinal axis of the waveguide to either extend or compress the spring and induce tensile or compressive strain, respectively. The effect, respectively, is to increase or decrease the size of the grating period ($\Lambda_G$).

FIG. 3(b) illustrates application of a flexure force in a direction perpendicular to the longitudinal axis of the waveguide and perpendicular to the plane containing the serpentine meanders of the spring. The effect of applying such a flexure force is to flex the spring in a direction of the flexure force either side of its point of application. When both ends of the spring are fixed in position, the result of such flexure is to elongate the spring by increasing the size of the grating period ($\Lambda_G$).

FIG. 3(c) illustrates application of a flexure force in a direction perpendicular to the longitudinal axis of the waveguide and parallel to the plane containing the serpentine meanders the spring. Effect of applying such a flexure force is to flex the spring in the direction of the flexure force either side of its point of application, resulting in elongation of the spring by net expansion of the grating period ($\Lambda_G$).

FIG. 3(d) shows application of a torque or torsion force to the serpentine spring waveguide, directed around the longitudinal axis of the spring to cause cork-screw twist in the meanders of the spring. This has the effect of expanding the grating period ($\Lambda_G$).

The three operating domains of the FLEX photonic structures are summarised below ($\lambda_0$) is the free space wavelength and $n_e$ is the effective index of the Bloch mode. A cladding with refractive index $n_{clad}$ is assumed:

Domain (1): When $\Lambda_G<\lambda_0/2n_e$, then scatter-free, lossless wave-guiding occurs.

Domain (2): When $\lambda_0/2n_e<\Lambda_G<\lambda_0(n_e+n_{clad})$ then Bragg reflection back into the waveguide happens (within the span of the photonic bandgap). There is no free space scatter until domain 3 (below) is reached.

Domain (3): When $\Lambda_G>\lambda_0(n_e+n_{clad})$ then part of the propagating wave scatters into free space at an angles determined by the grating period, the effective and cladding refractive indices and the free space wavelength.

In this waveguide platform, photonic tuning is achieved through physical movement of mass, however the mass movement is controlled on the nanometer scale and changes both the shape and properties of the metamaterial.

This new paradigm bridges the gap between sub-atomic tuning methods (such as carrier injection) and micron-scale MEMS tuning solutions. This platform is highly compatible with chip-scale integrated photonics, can be operated at wavelengths across a wide spectrum and will provide an extremely large tuning range with very low energy consumption. As a result, these characteristics will open up exciting new opportunities for chip-scale photonic integration, in particular in the areas of optical communications, mid- and far-infrared sensing, gas sensing, nano-opto-mechanics and inertial navigation systems.

The optical properties of the FLEX springs are intimately tied to their mechanical flexibility and range of extension. Similar to macroscopic structures, the shape of nanostructures and their material properties (such as Young's modulus, Poisson's ratio and the ultimate tensile strength, UTS), determine the range of deformation possible in such structures before fracture (if brittle) or plastic deformation (if ductile). Making the springs from soft ductile transparent materials (such as polymers) will require very small forces for deformation and these will operate well as long as they are not taken beyond the plastic deformation limit. Alternatively, structures fabricated in crystalline and polycrystalline materials are less prone to fatigue and will revert to their original shape (as long as they are stressed below their ultimate tensile strength (UTS)). However, their inherent brittleness causes them to fracture easily and so they have not been seriously considered for use in flexible waveguides until now.

For a flexible integrated photonics platform compatible with modern semiconductor technology, an optically transparent semiconductor material with a low Young's modulus and a large ultimate tensile strength is desirable. Quantitatively, a high fracture strain $\varepsilon_{max}$=UTS/E is desirable, where UTS is the ultimate tensile strength and E is Young's modulus. Among conventional semiconductors, silicon in particular has one of the highest fracture strains. Given the technological maturity and suitability of the silicon material platform for electronics, MEMS and photonics, the present embodiment will focus on silicon as the material for the FLEX waveguide. However, other materials are also suitable.

The value of Young's modulus for silicon is well documented, and ranges from 130 GPa to 187 GPa, depending on crystal orientation. The values of the ultimate tensile strength and fracture strain reported in experimental measurements cover a wide range of values. Theoretically speaking, silicon can withstand strains in of the order of several 10s of % (e.g. between about 10% and about 30%, such as: about 30%, or about 25%, or about 20%, or about 15%). There is also a strong dependence on the size of the structure, with smaller structures tolerating larger strains. It is possible to increase these values further by appropriate processing, for example annealing the silicon structures in hydrogen or forming gas will reduce the defect density and increase the UTS. A fracture strain of 4% is a conservative estimate for the FLEX nanostructures in the size range of waveguide structure illustrated in the present embodiment. Of course, different sizes and structures of waveguide may be implemented according to the invention, in which higher or lower values of fracture strain exist. Given that fracturing is a random process, this estimate is only to serve as a general guide for the opto-mechanical simulations described herein.

Mechanical Properties of FLEX Waveguide Structures

Figure 4:
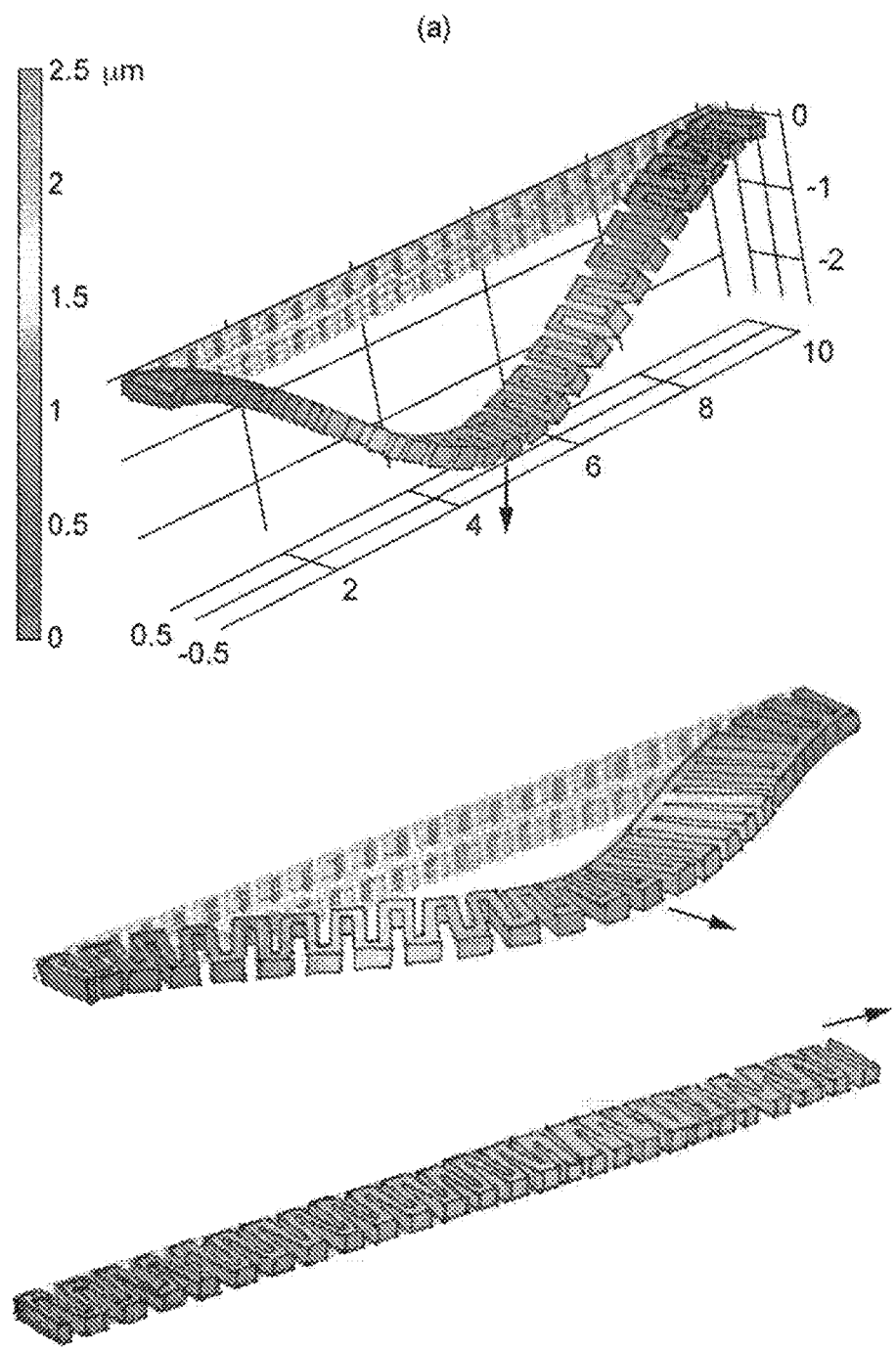
FIG. 4(a) schematically illustrates the deflection of application of plane-perpendicular flexure force, plane-parallel flexure force, and tensile force to a waveguide of FIG. 1(c)
FIG. 4(b) schematically illustrates the splaying deformation in one meander period of the spring of FIG. 1(c) resulting from the application of tensile force to a waveguide of FIG. 1(c)
FIG. 4(c) schematically illustrates the splaying deformation in one meander period of a spring resulting from the application of tensile force to a waveguide of FIG. 1(c) wherein the spring is modified to include chamfered edges.
Figure 4:
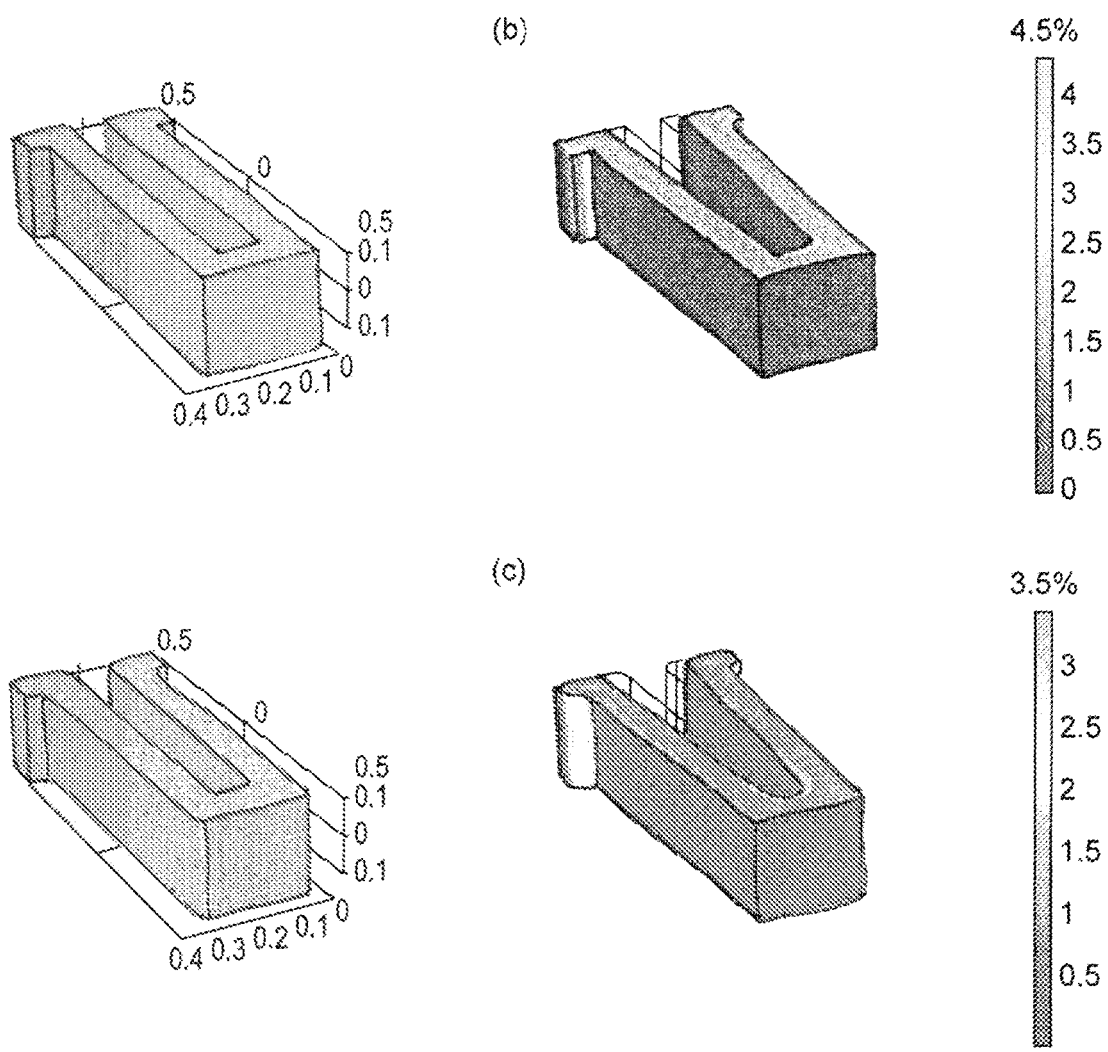
Figure 5:
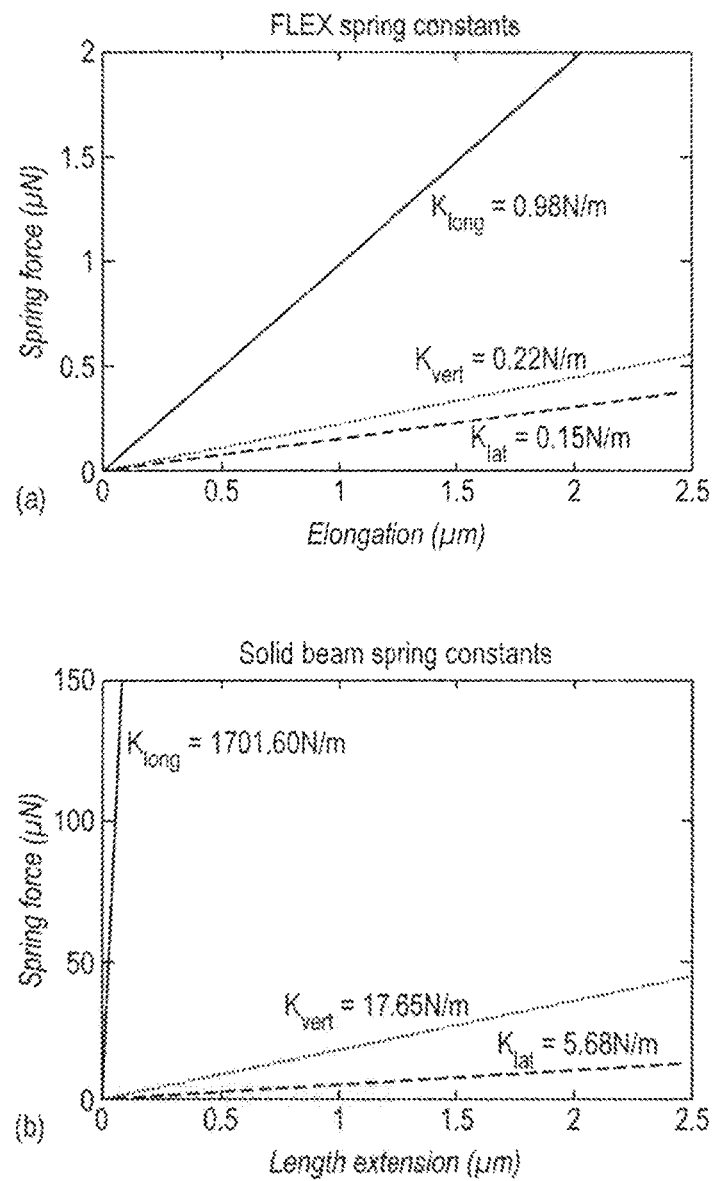
FIG. 5(a) graphically illustrates the deflection of application of plane-perpendicular flexure force, plane-parallel flexure force, and tensile force to a waveguide of FIG. 1(c) as a function of applied deflection force.
FIG. 5(b) graphically illustrates a comparative deflection of application of plane-perpendicular flexure force, plane-parallel flexure force, and tensile force to a solid waveguide of FIG. 1(a), of the same material as the waveguide of FIG. 1(c), as a function of applied deflection force.

Reference will now be made to FIGS. 4 and 5. The results illustrated in FIGS. 4 and 5 were calculated using commercially available COMSOL Multiphysics simulation software). The dimensions of the unit cell of the FLEX waveguide (i.e. one grating period) stated above, will be kept the same in reference to simulations described throughout this description. The simulations show that the curves are all in the linear spring regime for this range of deflection.

FIG. 4(a) illustrates vertical, lateral and longitudinal FLEX waveguide deformations, and FIG. 4(b) illustrates a single period of a FLEX waveguide and first principal strain at 100 nm extension while FIG. 4(c) shows the same structure with filleted corners enabling a 22% reduction of peak strain. In particular, FIG. 4(a) illustrates the displacement of spring periods of the serpentine spring optical waveguide when subjected to perpendicular flexure (FIG. 4(a), top; FIG. 3(b)), parallel flexure (FIG. 4(a), middle; FIG. 3(c)) and tensile strains (FIG. 4(a), bottom; FIG. 3(a)). FIGS. 4(b) and 4(c) show the splaying of a single spring period of the serpentine spring waveguide as a result of application of a longitudinal or flexure force/strain. In each figure, the left hand image shows the quiescent state of a spring period whereas the right hand image shows the splayed/strained state of the spring period.

In particular, FIG. 4(b) shows the calculated first principal strain of one period of the FLEX waveguide, before and after being subjected to a symmetric 100 nm extension (25% elongation). The force for creating this displacement is calculated to be 2.5 µN. In this example, the FLEX waveguide is deliberately slightly over-stretched in the sense that the calculated strain in the structure shows a peak value of 4.5% at some of the high-stress points which is higher than the targeted fracture strength of 4%. Of course, lesser elongations avoid this circumstance. Alternatively, engineering the shape of the structure can substantially reduce this stress. For example, the lower structure in FIG. 4(c) shows the same structure with slightly fileted corners, resulting in substantial reduction (22%) of the peak strain to 3.5%, which is now below the nominal fracture strain. Further shape optimization and choosing the optimal crystal orientation will affect both the UTS and Young's modulus and will further reduce the peak stress, resulting in even larger elongations.

FIG. 5(a) illustrates spring constants for a 10 µm long FLEX waveguide, and for comparison FIG. 5(b) illustrates spring constants for a regular 10 µm beam waveguide. FIG. 5(a) shows the spring constants for vertical, lateral and longitudinal deflection for the serpentine spring waveguide illustrated in FIG. 4(a). The waveguide is a single mode silicon FLEX waveguide. The length of the waveguide was 10 µm, having a period of 400 nm. The spring wire was rectangular in cross-section and the spring wire width was 100 nm, whereas the waveguide width was 1000 nm. The spring wire height was 250 nm. For comparison, the spring constants for a single mode silicon beam waveguide with rectangular cross section (length: 10 µm; waveguide width: 400 nm; wire height: 250 nm) are also shown in FIG. 5(b).

In particular, referring to FIG. 5(a), the spring constants for the serpentine spring waveguide in question are $K_{long}$=0.98 N/m in respect of forces applied longitudinally along the longitudinal axis of the waveguide so as to stretch or compress the spring longitudinally. Compare this value to the value of $K_{long}$=1701.60 N/m which is the longitudinal spring constant of the solid beam, graphically shown in FIG. 5(b). The difference is striking and illustrates the ease with which the serpentine spring may be repeatedly stretched or compressed by considerable amounts.

Similarly, the vertical spring constant $K_{vert}$=0.22 N/m in respect of "vertical" distortion of the serpentine spring waveguide, is in response to forces applied in a direction perpendicular to both the longitudinal axis of the spring and the plane containing the meander of the spring. This direction of force is as shown in FIG. 3(b). It is much smaller than the corresponding spring constant, $K_{vert}$=17.65 N/m for the solid beam shown graphically in FIG. 5(b).

Furthermore, the lateral spring constant $K_{lat}$=0.15 N/m in respect of "lateral" distortion of the serpentine spring waveguide, is in response to forces applied in a direction perpendicular to the longitudinal axis of the spring and parallel to the plane containing the meander of the spring. This is the direction of force shown in FIG. 3(c). The corresponding lateral spring constant of $K_{lat}$=5.68 N/m for the solid beam (FIG. 5(b)) is far greater.

It is obvious that the spring constants of the FLEX structure are much smaller than the unstructured silicon beam. In particular, the longitudinal stiffness constant of the FLEX waveguide is about 1/1800 that of a silicon beam with the same thickness. This drastic difference in extensibility will allow for a much larger range of motion in FLEX structures, resulting in devices with a very wide optical tuning range. As mentioned, remaining below the UTS is an important criteria for avoiding fracture in the material of the waveguide.

Optical Properties of Subwavelength FLEX Waveguides

Figure 6:
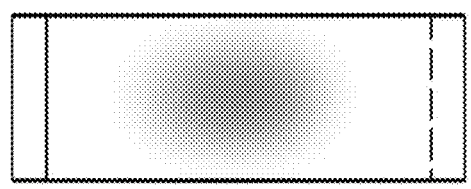
FIG. 6(a) graphically illustrates the power flow distribution of light guided by the waveguide of FIG. 1(c), across one meander period thereof, when the waveguide is in the quiescent state. A view down the axis (left-hand figure) is shown together with a view across that axis (right-hand figure)
FIG. 6(b) graphically illustrates the power flow distribution of light guided by the waveguide of FIG. 1(c), across one meander period thereof, when the waveguide is in a stretched state. A view down the axis (left-hand figure) is shown together with a view across that axis (right-hand figure)
Figure 6:
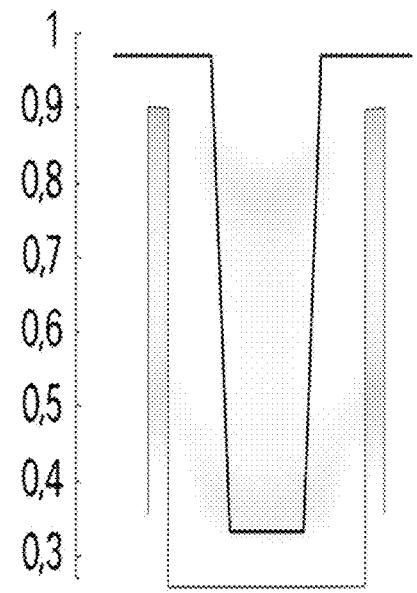
Figure 6:
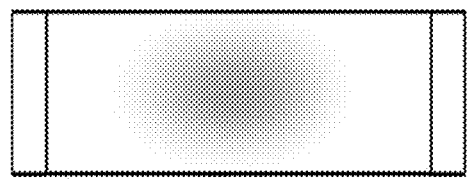
Figure 6:
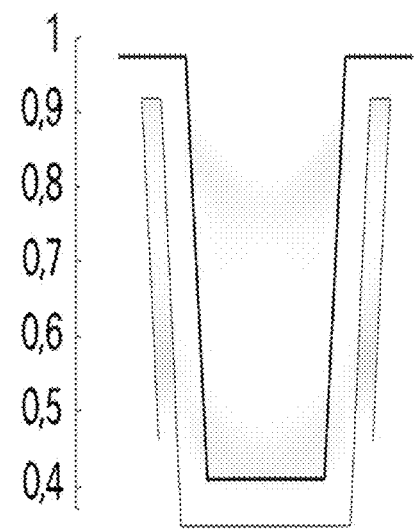
Figure 7:
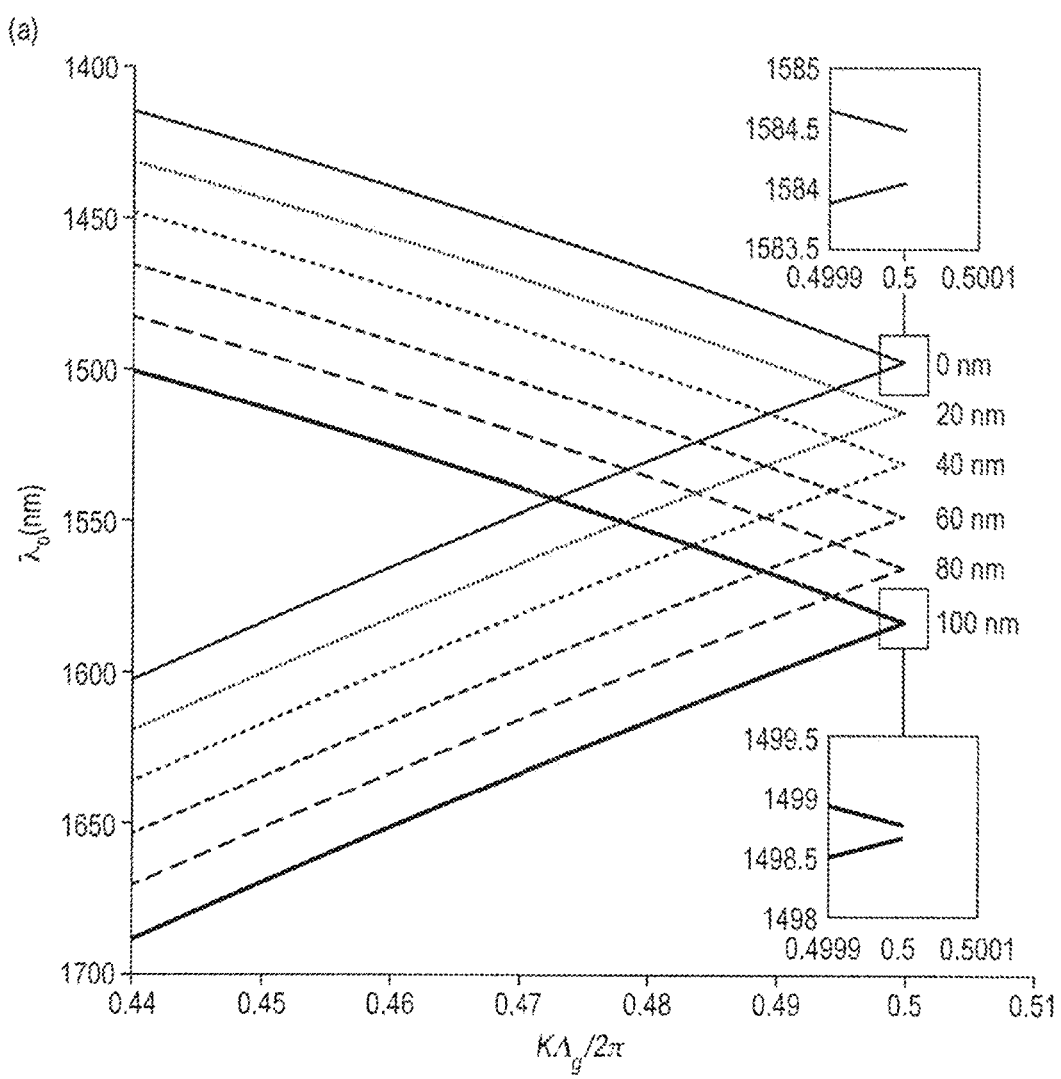
FIG. 7(a) graphically illustrates the variation of the width and position of a photonic band gap of the waveguide of FIG. 1(c) as a function of a Bloch-mode wave number of light relative to the grating period of the waveguide.
FIG. 7(b) graphically illustrates the variation in the Bloch mode effective refractive index of the waveguide of FIG. 1(c) and the phase-shift in the guided light as a function of the extension length of the waveguide of FIG. 1(c)
Figure 7:
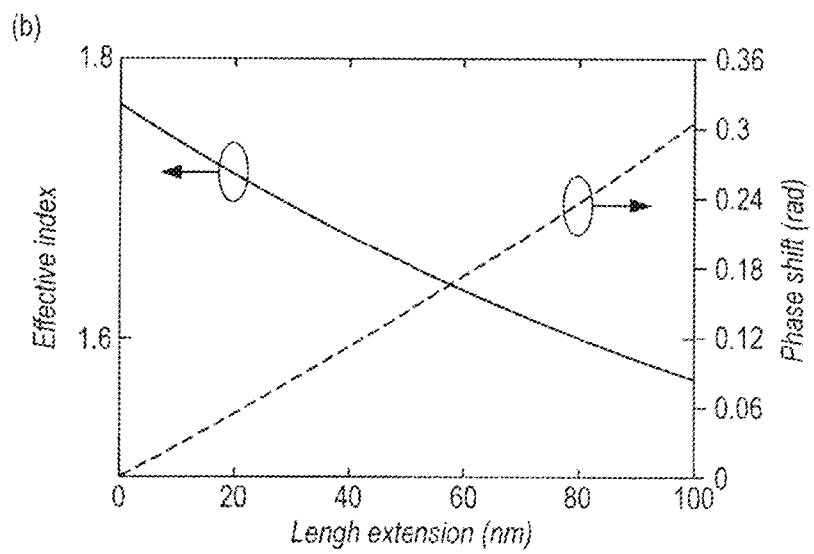

Reference is now made to FIGS. 6 and 7.

FIGS. 6(a) and 6(b) show horizontal and longitudinal cross-sections of the Bloch modes of a FLEX waveguide at 0.0 nm and 100 nm elongation. These images show the normalized power flow of the Bloch mode. In particular, each one of FIGS. 6(a) and 6(b) shows two cross-sectional views of one spring period (full meander) are shown. A first view (right-hand side) is a vertical view directed downwardly towards the plane containing the spring meander. A second view (left hand side) is a view directed along the longitudinal axis of the spring. It is to be noted that the Bloch modes of guided light are not confined within the body of the meandering spring wire. One can immediately see, from inspection of FIG. 6, that the Bloch modes of the guided light within the serpentine spring waveguide travel along the longitudinal axis of the spring so as to pass directly across successive grating fringes (transverse spring meanders) and directly across the spaces between grating fringes. In FIG. 6(a), the spring period corresponds to the condition when the spring is quiescent and without the application of strain or elongation. Conversely, FIG. 6(b) shows the same spring period when the spring is longitudinally strained to 100 nm elongation. The spring is 10 µm long when quiescent.

FIG. 7(a) presents a dispersion plot of the FLEX periodic waveguide for varying elongation/period of the waveguide. The insets in the figure show the zoomed-in view revealing photonic stop bands. FIG. 7(b) shows a plot of effective index vs elongation (left-hand vertical axis), together with a plot of the phase delay increase vs. elongation (right-hand vertical axis). The calculations resulting in FIGS. 6 and 7 were performed along the direction of propagation (i.e. the waveguide axis) of the Bloch mode.

In particular, FIG. 7(a) shows six separate dispersion curves for the 10 µm long serpentine spring waveguide when subjected to a respective one of six different elongations is as follows: 0 nm; 20 nm; 40 nm; 60 nm; 80 nm; 100 nm. One can see that the effect of increasing the elongation of the waveguide is to shift the spectral position of the photonic bandgap (see insets) of the waveguide. This provides a spectrally-selective function suitable for application in a spectrometer, or other optical device requiring spectral tune ability. That is to say, the free-space wavelength ($\lambda_0$) at which the spring waveguide is reflective (i.e. the bandgap) is controllable by controlling the mechanical elongation of the spring. This permits the waveguide to reflect a desired narrow range of wavelengths at will. FIG. 7(b) graphically illustrates the change in the effective refractive index ($n_e$) of the optical waveguide as a function of extension of the 10 μm waveguide from 0 nm extension (quiescent) to 100 nm extension in length (longitudinal strain). A corresponding phase shift occurs in the guided optical radiation resulting from transmission along the full length of the waveguide.

Accordingly, the invention may provide an optical spectrometer or optical filter apparatus including the spring waveguide defining a photonic bandgap the spectral position of which is variable according to the extension applied to the spring waveguide by an actuator of the spectrometer or wavelength-selective filter (e.g. Bragg reflector). The optical spectrometer of filter may be arranged to receive optical radiation comprising a broader optical wavelength spectrum than is defined by the photonic bandgap of the waveguide, for input to the optical waveguide, whereby only that portion of the input spectrum overlapping the photonic bandgap is reflected by the waveguide, the rest being transmitted. The narrow-band reflected part may then be subject to subsequent use as desired.

Instead of using approximate methods to calculate the optical properties of the FLEX waveguide, a rigorous numerical solution for the Bloch mode of this periodic structure has been performed using a 3D finite element eigenmode solver (COMSOL computational software package). An advantage of using this is that it allows the optical properties to be concurrently considered alongside the mechanical deformations. Note that the FLEX waveguide structure supports both quasi-TE and quasi-TM modes but for brevity only the results pertaining to the TE mode will be presented here. However, it is to be noted that the analysis and conclusions presented here apply equally to the quasi-TM mode in a qualitative manner.

A unit cell (i.e. one grating period) of the structure was simulated, assuming periodic boundary conditions and mechanical elongations up to 100 nm. The material dispersion of silicon was taken into account. The effect of localized stress-induced birefringence in the structure was considered through the incorporation of the photoelastic stress tensor into the model, however the simulation results show negligible deviation from the isotropic model.

In summary, regarding FIGS. 6 and 7 collectively, FIG. 6 shows the spatial power distribution of the Bloch mode (in the form of a slightly undulating wave) for the FLEX waveguide in an unstressed state (FIG. 6(a): no elongation) and in a stressed state when subject to a 100 nm longitudinal elongation. The resultant set of dispersion curves are shown in FIG. 7(a). The insets show the zoomed-in photonic stop bands when the FLEX waveguide is not elongated and when the FLEX waveguide is longitudinally elongated by 100 nm. From these dispersion curves the change in effective refractive index vs. mechanical extension can be derived for each wavelength of guided light. FIG. 7(b) (referring to the left-hand axis) shows the tuning curve for an optical wavelength of guided light of 1600 nm. At this wavelength the sub-wavelength condition is maintained over the full 100 nm range of mechanical elongation. A large effective refractive index drop of about 0.2 is achieved when the FLEX waveguide is subject to a 100 nm elongation. However, calculation of the overall phase delay due to both the length increase and the effective refractive index change using the formula:

$$\Delta\varphi(x) = \frac{2\pi}{\lambda}[n_e(x)L(x) - n_e(x=0)L(x=0)]$$

(L(x) is the length of the waveguide and x is the longitudinal elongation of the FLEX waveguide), shows an overall increase in the phase delay. The group delay also behaves in a similar fashion.

As is discussed above, FIG. 7(b) (referring to the right-hand axis) shows the phase delay caused by elongation (x) of a single FLEX period. At a longitudinal elongation of x=100 nm, the phase delay is 0.31 rad. This means that a π phase shift can be realized with only 10 periods of the FLEX waveguide, having unstressed/stressed lengths of 4 μm/5 μm respectively. This makes the FLEX waveguide useable as an extremely short guided wave phase modulator. It is important to point out that this method of tuning has distinct advantages compared to other integrated guided-wave photonic tuning approaches, which are dominantly based on carrier or thermal effects. The refractive index change due to carrier injection is on the order of 10-4, resulting in a requirement for modulator lengths in the range of tens of micrometers to millimeters. This large size is undesirable in many applications.

Thermal tuning can be used to achieve a larger refractive index change ($1.6\times10^{-3}$ per 100° C. in silicon), but this comes at the expense of energy inefficiency, since a heating electrical current must flow constantly to maintain the refractive index shift. The FLEX waveguide modulator, on the other hand, provides a much larger modulation range while having negligible static energy expenditure (e.g. using electrostatic actuation to implement extension).

Figure 8:
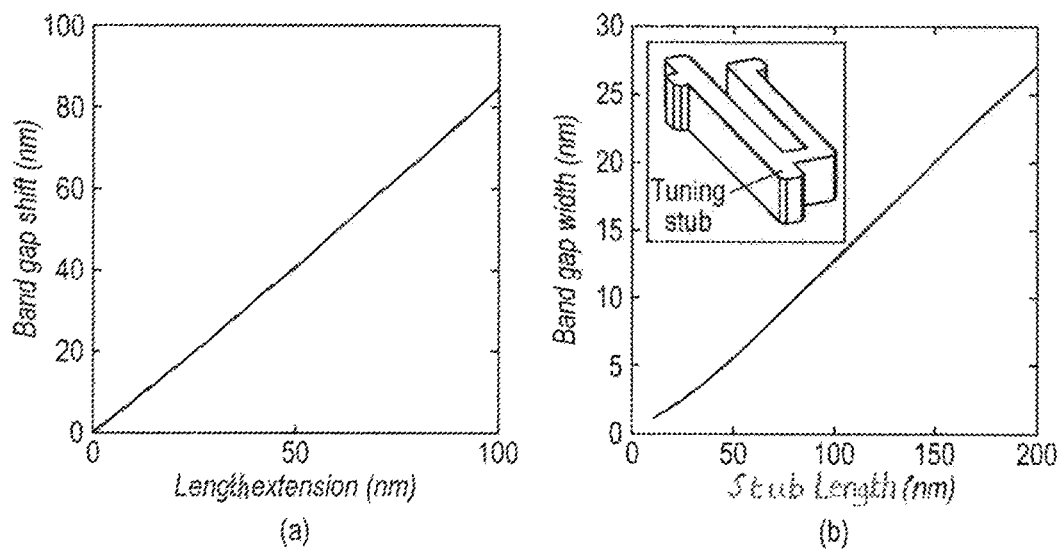
FIG. 8(a) graphically shows that variation in the shift in the spectral position of the photonic band gap of the waveguide of FIG. 1(c), as a function of the extension length of the waveguide of FIG. 1(c)
FIG. 8(b) graphically shows that variation in the spectral width of the photonic band gap of the waveguide of FIG. 1(c) when modified to include tuning stubs along its length, as a function of the length of the tuning stubs (in common)

Reference is now made to FIG. 8. FIGS. 8(a) and 8(b) illustrates the change in spectral position of the photonic bandgap (FIG. 8(a)) as a function of longitudinal length extension of the spring waveguide, and the spectral width of the photonic bandgap (FIG. 8(b)) as a function of the length of tuning stubs which may be incorporated into each period of the waveguide as indicated in the inset of FIG. 8(b).

It is to be noted that a change (sweep) in bandgap spectral position of over 80 nm is achievable by extending the waveguide period by a mere 100 nm. In addition, a photonic band gap width of less than 1 nm is achievable when no tuning stubs are incorporated into the waveguide. Broader photonic band gaps are achievable by incorporating tuning stubs having lengths from about 10 nm up to about 200 nm, in order to achieve a band gap width of about 1 nm to about 27 nm, respectively. The width of the bandgap is in direct proportion to the length of the tuning stubs. The tuning stubs applied to each period of the waveguide meander/period may each share the same length of tuning stub, or alternatively, the length of tuning stubs may vary as between different periods of the waveguide.

A tuning stub may be in the form of an extension/projection of a transverse, or normal, spring wire beam. A tuning stub may share the same cross-sectional dimensions as the transverse spring wire beam from which it extends, at an end or each end of that spring wire beam. The tuning stub pair may be provided in only one of the two transverse spring wire meanders/beams within each spring period.

Another advantageous feature of the flex waveguide comes from the metamaterial nature of FLEX structure. By designing the dimension and shape of the FLEX unit cell (i.e. one grating period), one may engineer a tailored refractive index profile which can then be mechanically tuned. Also, since tuning is based on changing the shape of a nanostructure rather than modifying its bulk material properties, it can be applied across the full optical transparency spectrum of the spring material without any absorption losses (unlike carrier injection). In the case of silicon this permits new tunable photonic devices operating at medium and long infrared wavelengths. Using other materials such as silicon nitride and thin film nanocrystalline diamond, this advantage can be extended even further, to other parts of the optical spectrum.

Flex Waveguides in the Bragg Regime

Even though the focus of the previous discussions has been on the non-scattering (subwavelength) propagation regime, the FLEX waveguide may also be used in the Bragg reflection and free space scattering regimes. In particular, FLEX structures operating at the first Bragg resonance are very amenable to integration with both regular stationary waveguides and tunable subwavelength (non-resonant) FLEX waveguides. In particular this will allow tunable Bragg mirrors and tunable cavities to be directly integrated into one photonic platform. For example, at FLEX waveguide period elongation of 100 nm, the centre of the FLEX photonic stop band may be shifted by 85 nm as shown in FIG. 8(a). This is a very large shift.

The basic 'S' shaped structure of the present embodiment of the FLEX waveguide has a narrow photonic stop band (FIG. 7(a), inset) due to the very slight amount of refractive index modulation. The refractive index modulation (and thereby Bragg mirror reflectivity) can be easily increased by inclusion of tuning stubs, which may be relatively small, such as those shown in the inset of FIG. 8(b). By changing the tuning stub length, the width of the photonic stop band can be adjusted over a wide range. This is graphically illustrated in FIG. 8(b). Increasing the grating period of the waveguide even further past this point (either by elongation or by design) will lead to the free space scattering regime where the FLEX platform can be used to create guided and free space diffraction gratings with adjustable periods, with applications in free space beam scanning and LIDAR.

Realization of Devices and Subsystems in the FLEX Waveguide Platform

The discussions presented above demonstrate that the FLEX waveguide offers a solution for implementing widely tunable nano-opto-mechanical devices. There now follow examples of several such devices and subsystems that can be realized using this waveguide. While this is not an exhaustive list of possibilities, it illustrates several examples in which this waveguide may be utilized for practical photonic or motion sensing applications.

Tunable Bragg Gratings

A Bragg mirror with tunable stop band and adjustable bandwidth can be implemented using the 'stub' structure (FIG. 8(b)). Such a mirror can have many practical applications. For example, it can be used as a widely tunable notch filter in transmission (or a narrowband filter in reflection) for on-chip spectroscopy. The concept underpinning the FLEX waveguide can also be used to create chirped Bragg gratings. This may be implemented by structuring the waveguide such that its successive spring periods systematically change in size along a/the length of the waveguide. The spatially changing/different spring periods result not only in spatially changing/different grating periods, but also result in a spatially changing/different spring constant along the length of the waveguide. Thus, elongation will not only change the length of the waveguide but will also change the chirp of the waveguide since the varying spring period results in a spatially variable spring constant. Mechanically tunable chirped gratings may be used in fibre Bragg gratings for dispersion control. The tuning range provided by a chirped FLEX waveguide is greater than what is possible in existing systems. It is believed that no instance of a chip-scale chirped grating with tunable chirp has been demonstrated to date. Given the utility of such chirped gratings for on-chip dispersion control, it is believed that a chirped FLEX waveguide will be of considerable use in optical communications applications.

Figure 9:
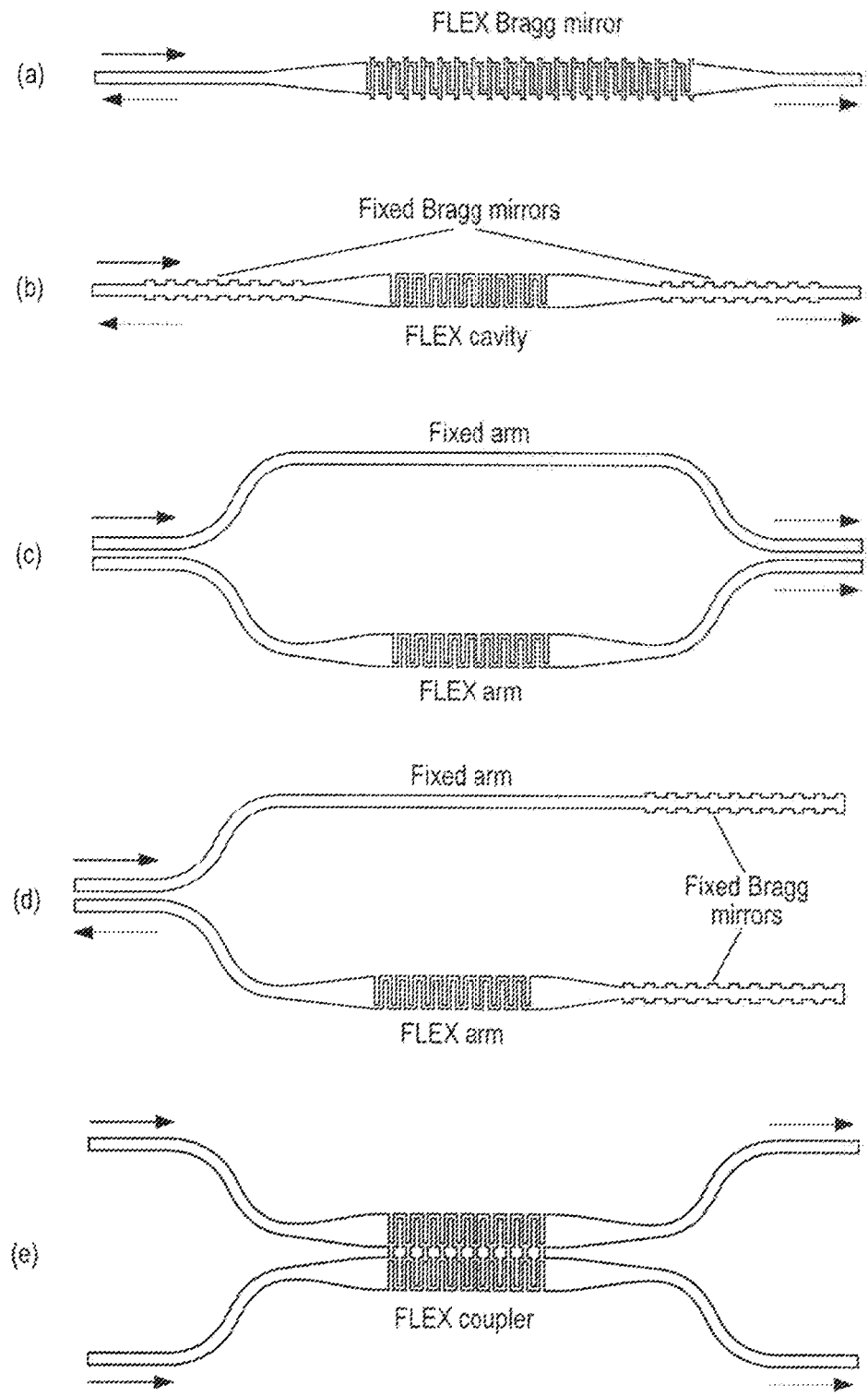
FIG. 9(a) schematically illustrates a Bragg reflector comprising the waveguide of FIG. 1(c) when modified to include tuning stubs along its length.
FIG. 9(b) schematically illustrates a Bragg resonator comprising the waveguide of FIG. 1(c) and including fixed-period Bragg reflectors at each end of the waveguide.
FIG. 9(c) schematically illustrates a Mach-Zehnder interferometer comprising the waveguide of FIG. 1(c) disposed along the optical path of one of the two arms of the interferometer.
FIG. 9(d) schematically illustrates a Michelson interferometer comprising the waveguide of FIG. 1(c) disposed along the optical path of one of the two arms of the interferometer and including fixed-period Bragg reflectors at the output end of each arm of the interferometer.
FIG. 9(e) schematically illustrates a directional coupler comprising the waveguide of FIG. 1(c) disposed along the optical path of each one of the two arms of the coupler.

Reference is now made to FIG. 9 which shows the implementation of photonic blocks in the FLEX platform. FIG. 9(a) illustrates a Bragg mirror. FIG. 9(b) illustrates a Fabry-Perot resonator. FIG. 9(c) illustrates a Mach-Zehnder interferometer. FIG. 9(d) illustrates a Michelson interferometer. FIG. 9(e) illustrates a directional coupler. Device optical input signals (output signals) are denoted by solid (dotted) arrows.

Interferometers and Resonators

Since elongation of the FLEX waveguide changes the phase of an optical signal, interferometers and resonators are a natural choice for measuring and quantifying this phase change. Three examples are:

Mach Zehnder interferometer (MZI): The MZI shown in FIG. 9(c) has one fixed arm and one arm containing a movable FLEX waveguide. It may be used to detect subtle phase changes in the movable arm. The arm lengths may be adjusted so that the interferometer is operating at the quadrature point for maximum sensitivity.

Michelson interferometer (MI): In this case the FLEX waveguide is cascaded with a fixed Bragg mirror as shown in FIG. 9(d). Both the mirrors and the FLEX waveguide are suspended and placed at one output of a fixed directional coupler. The other output is terminated with a fixed Bragg mirror. This architecture has a single input/output port in the movable section which will simplify opto-mechanical testing and will also offer straightforward integration. This structure may be employed in a nano-photonic accelerometer, and an example of this is discussed below.

Fabry-Perot cavity: The FLEX Fabry-Perot cavity (FIG. 9(b)) consists of a movable FLEX waveguide placed between two fixed Bragg mirrors and can be operated in transmission or reflection. Calculations show that a FLEX waveguide defining the cavity may be tuned over a spectral range of 150 nm (at telecommunication wavelengths) by 25% in length. Through careful design of taper points and control of the fabrication process, high Q factors of up to about $Q=10^5$ (in silicon) may be achieved, resulting in extremely sensitive and widely tunable opto-mechanical filters. Higher Q factors using other materials such as silicon oxide or silicon nitride may also be achievable.

Directional couplers: A directional coupler is a fundamental component of an integrated photonics platform. In the most basic form it consists of two evanescently coupled parallel waveguides. Most implementations of directional couplers are fixed, with some level of tunability provided in some cases using thermal or electro-optic modulation. Some instances of MEMS-based directional couplers have been demonstrated, though in these cases tuning is achieved by changing the gap between the two waveguides, rather than changing the waveguide index profile. Using the FLEX waveguide one may create a continuously tunable directional coupler, as shown in FIG. 9(e). The width and length of connecting struts between the waveguides can be adjusted to provide the desirable coupling coefficient between the waveguides. These struts also serve to maintain the structural integrity of the coupler.

Applying a tensile force to the ends of the coupler will change both the coupling between waveguides and also the coupler length. Through this mechanism one can readily tune the coupling ratio from 0.0 to 1.0 with very short coupling lengths. Calculation of the beat wavelength between the symmetric and anti-symmetric Bloch modes of the coupler shows that a 40 nm period increase (10% elongation) is sufficient to create a π phase shift between the two arms, assuming an initial device length of 40 µm. In addition, the base wavelength of operation can be tuned over a very broad range.

The coupler can be designed to operate in the Bragg regime, thereby creating a resonant directional coupler with wavelength dependent add/drop functionality. The FLEX waveguide inherently allows grating period change, thereby allowing the adjustment of the drop port wavelength over a wide range, leading to new solutions for on-chip wavelength routing. This capability is believed to be unique to the FLEX waveguide.

Multi-Axis Accelerometer

Figure 10:
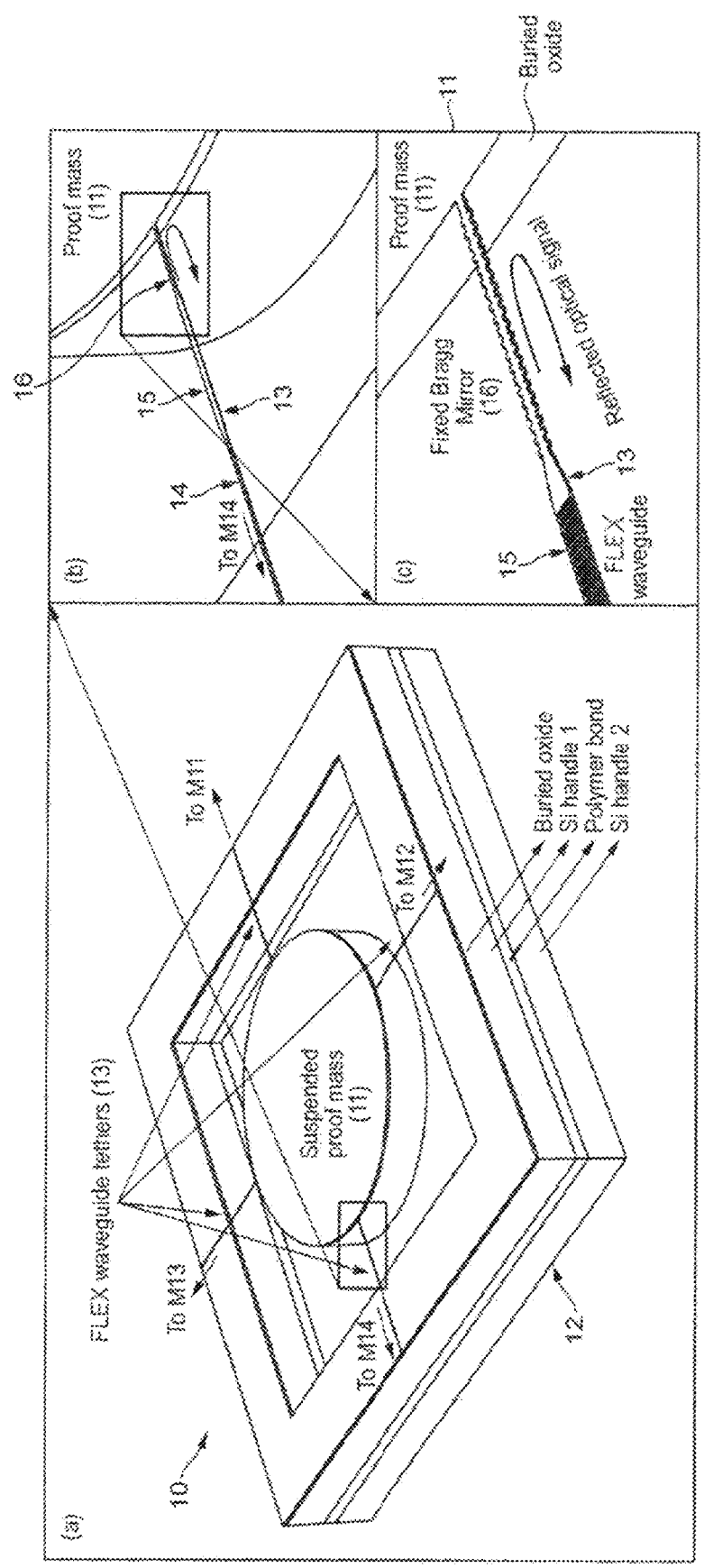
FIG. 10(a) illustrates an accelerometer with a proof mass tethered to four spring waveguides of FIG. 1(c) and terminated with fixed Bragg gratings.
FIG. 10(b) illustrates an accelerometer of FIG. 10(a) in magnified detail.
FIG. 10(c) illustrates an accelerometer of FIG. 10(b) in magnified detail.
FIG. 10(d) illustrates a component part of an accelerometer comprising a proof mass tethered to four spring waveguides of FIG. 1(c)

Reference is now made to FIG. 10. In particular, FIG. 10(a) illustrates a multi-axis accelerometer realized using the FLEX platform. FIG. 10(b) and FIG. 10(c) are zoomed-in images of the support tethers showing the cascaded FLEX waveguide and Bragg waveguide mirror. MI refers to Michelson Interferometers (not shown).

As described herein, the basic FLEX waveguide enables sensitive coupling of mechanical motion to the phase of a guided optical signal. This feature can be used to create a sensitive multi-axis accelerometer. Accelerometers have become ubiquitous, thanks to their widespread usage in smartphones, cameras and other personal electronics. Most accelerometers are based on capacitive sensing or piezoelectric sensing, where movement of a suspended proof mass changes the gap in a capacitor or generates an electrical signal. The sensing method and device design govern properties such as range, accuracy, drift and shock resistance.

Several instances of photonic accelerometers have been demonstrated, for example using free space nano-grating displacement sensors attached to a proof mass. The operation of photonic accelerometers is bound to the shot noise and standard quantum limits, therefore having the potential for high-bandwidth and high-resolution acceleration sensing. The FLEX waveguide offers a highly integrated photonic sensing approach for detecting and measuring the movement of the proof mass. One implementation in an accelerometer is shown in FIG. 10, which shows a suspended proof mass tethered by four FLEX waveguides (four used for illustrative purposes) placed in cascade with static Bragg mirrors. Each tether also serves as the movable arm of an on-chip Michelson interferometer (interferometers denoted MI but not shown in the image). The downward force of gravity causes a small pre-stress in the spring structure of the waveguides. Acceleration of the structure will elongate or shorten the lengths of the FLEX waveguide tethers and this change can be optically sensed using the interferometers (MI).

Referring to FIG. 10(a), there is shown an accelerometer (10) assembly comprising a proof mass (11) suspended within a frame (12) by a plurality of spring waveguides (13) which each connect the proof mass to the frame. The proof mass is connected to the frame only by the spring waveguides, which act as a part of a respective tether to hold the proof mass within the frame in a suspended state. In this example, for FLEX spring waveguides are employed and are arranged symmetrically about the sides of the proof mass, at 90° intervals, so as to extend from an outermost top surface layer of the proof mass. The material of the outermost top surface of the proof mass is integral and continuous with the material of the spring waveguides, and may be any suitable optically transmissive material such as silicon. Inset FIGS. 10(b) and 10(c) illustrates the structure of each tether in more detail as follows.

A tether comprises three successive sections integrally formed in the body of the tether, including a strip waveguide section (14) of uniform rectangular cross-section, a FLEX waveguide section (15) and a Bragg mirror waveguide section (16). The FLEX waveguide section is located between the strip waveguide section and the Bragg mirror waveguide section. The strip waveguide section is connected, at one end, to the frame (12) whereas the Bragg mirror waveguide is connected, at one end to the proof mass (11). In this way, the FLEX waveguide section extends between the strip waveguide section and the Bragg mirror waveguide section.

Each tether is arranged in optical communication with a respective optical interferometer (MI1, MI2, MI3, MI4, not shown) connected to the strip waveguide section of the tether beyond the frame of the accelerometer. A tether is arranged to receive input light from the respective interferometer (at the strip waveguide section thereof) and to guide the input light along the tether through the FLEX waveguide portion and into the Bragg mirror waveguide portion. The wavelength of light input by the interferometer is selected to be within the reflection band of the Bragg waveguide section. The reflected light then returns to the optical interferometer via the FLEX waveguide portion and the strip waveguide portion, in turn, whereupon it is analysed interferometrically by comparison to a reference optical signal (e.g. light corresponding to the wavelength of the input signal). The optical interferometer is arranged to generate an output signal which is variable according to changes in the length of the optical path of light traversing the tether in question. That length is variable according to extension/compression of the FLEX waveguide portion of the tether.

Figure 10D:
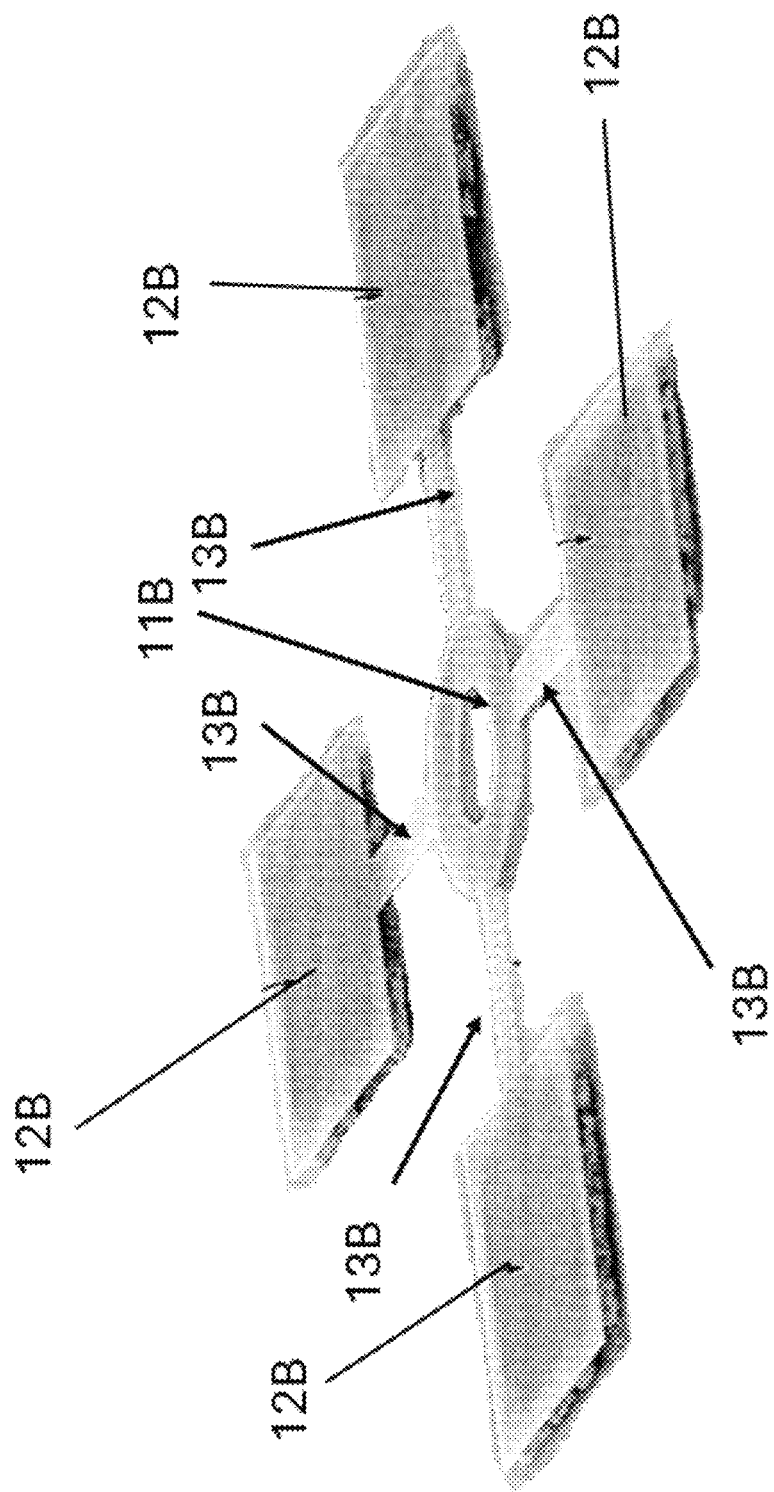

It is important to highlight the fact that in this configuration three different functionalities are being integrated into each FLEX structure: structural support, photonic waveguiding and mechanical transduction. This capability of multidisciplinary integration is a particular characteristic of the FLEX platform. Calculation of the tether tension at 1G gravity (equal to 25nN per 50 µm spring tether for a 100×100×50 µm³ silicon proof mass) shows that the FLEX tethers can be readily designed to support the movement of a relatively large proof mass at several G forces without fracturing. Note that in alternative embodiments, the proof mass may also only consist of the device layer (i.e. omitting the handle/oxide/device layer stack shown in the figures), resulting in very light proof masses, which translates to high mechanical Q and reduced Brownian noise. FIG. 10(d) illustrates a component part of an accelerometer with a proof mass tethered by four spring waveguides of FIG. 1(c). In particular, FIG. 10(d) shows an electron microscope image of a component part of an accelerometer including a proof mass (11B) comprising an annular silicon disc suspended by four separate substantially identical spring waveguides (13B) formed from silicon and structured according to FIG. 1(c) of the invention. As with the embodiment illustrated in FIG. 10(a), the four spring waveguides are disposed in co-planar fashion and with a 90 degree angular in-plane separation between neighbouring spring waveguides. This serves to join the proof mass to each one of four anchor platforms (12B) from which a respective spring waveguide extends to the proof mass thereby to collectively suspend the proof mass. Optical input/output couplers (not shown) may be arranged upon a respective anchor platform to inject and retrieve light into/from a respective waveguide for detection. The terminal end of a respective spring waveguide, where it meets the proof mass may serve to reflect light injected into the respective waveguide from the optical input/output end thereof, so as to return the light to the optical input/output end for retrieval. Alternatively, one, more than one, or each spring waveguide may further extend across (and optionally, beyond) its respective anchor platform such that the optical input/output end thereof lies upon or beyond the anchor platform, as desired.

Actuation Methods

The FLEX waveguides are tunable by mechanical structures, and effective actuation methods compatible with this waveguide are described below.

Figure 11:
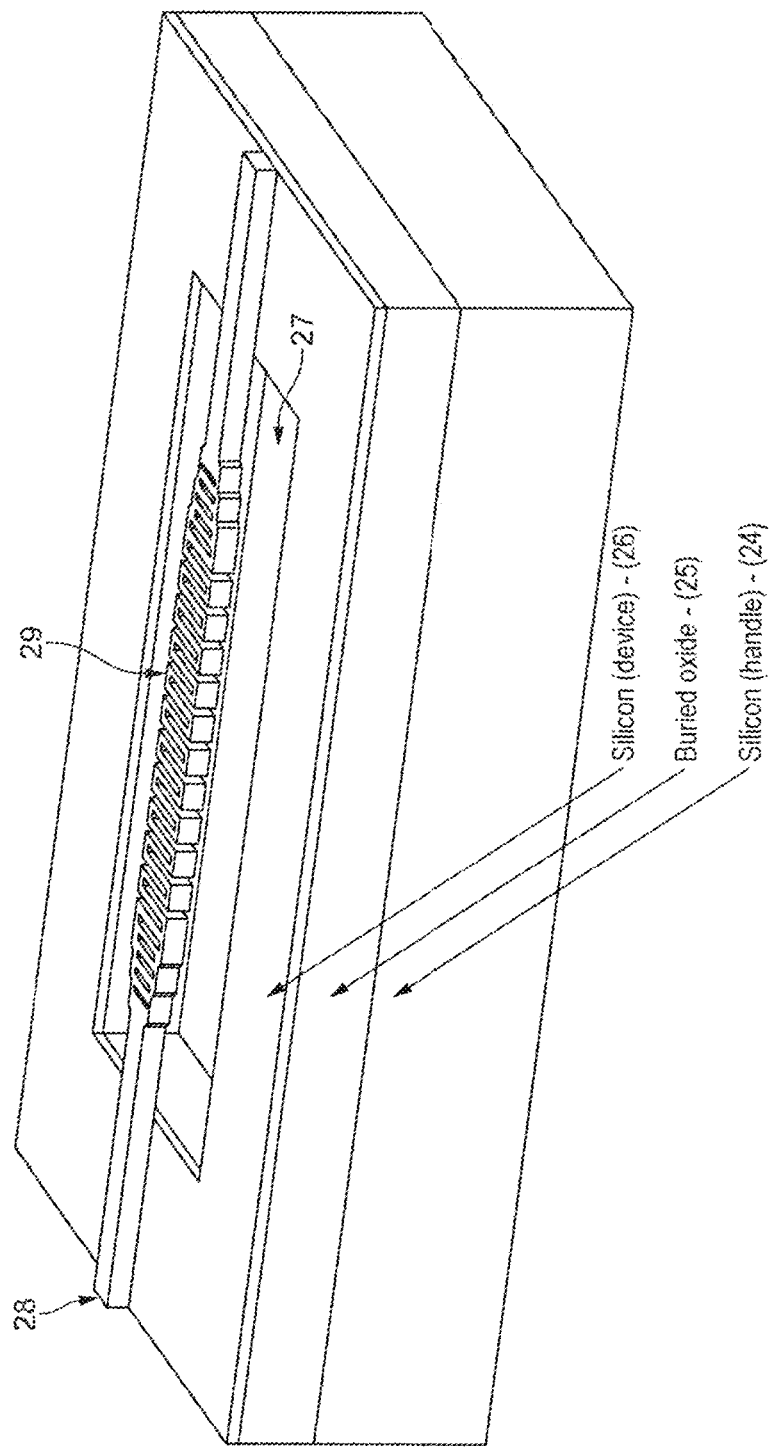
FIG. 11 illustrates a freely-suspended flexible tunaeable device (e.g., resonator) in the SOI (Silicon on Insulator) platform for electrostatic or optical force tuning of the device, based on the periodic flexible nanospring waveguide concept.

Reference will now be made to FIG. 11.

Electrostatic beam actuation:

A suspended bridge FLEX waveguide device (20) in the Silicon on Insulator (SOI) platform provides a convenient method for electrostatic actuation of the waveguide (FIG. 11). The device comprises a silicon handle substrate layer (24) overlaid by a buried-oxide substrate layer (25) which is in turn covered by a silicon top layer (26) of the device. A rectangular trench (27) is cut into the silicon top layer and the underlying buried oxide layer to reveal the silicon handle layer at the base of the trench. The walls of the trench are defined by the buried oxide layer and silicon top layer of the device. An optical waveguide (28) is formed upon the silicon top layer and extends across the rectangular trench from one short rectangular side of the trench to the opposite rectangular side, in the direction of the longitudinal axis of the trench. The optical waveguide is in the form of a beam waveguide (in cross-section) where it resides upon the silicon top surface of the device, and where it extends from the silicon top layer from an edge of the rectangular trench, at each of the opposite edges referred to above. The optical waveguide changes in structure from a simple beam waveguide into a FLEX waveguide (29) structure according to the invention, at those parts thereof between the opposite edges of the trench. Thus, the FLEX structure is suspended at its opposite ends above the floor of the trench, between two beam waveguide structures which overhang the opposite edges of the trench. The trench provides a small gap between the FLEX waveguide (29) and substrate (trench floor) and this allows large vertical deflections (100s of nanometers) at low actuation voltages (<20V), due to the increased flexibility provided by the FLEX structure. For comparison, a regular single mode beam waveguide in this configuration will only move by a few nanometers. Owing to a high refractive index (~1.8) of the spring material of the FLEX waveguide, and the large radius of curvature in the vertical direction, optical bending losses are negligible. This architecture may not only allow static optical measurements but may also facilitate the measurement of the mechanical Q and frequency response of the structures, using electrical excitation (by biasing the silicon handle and the partially etched device layer).

Figure 12:
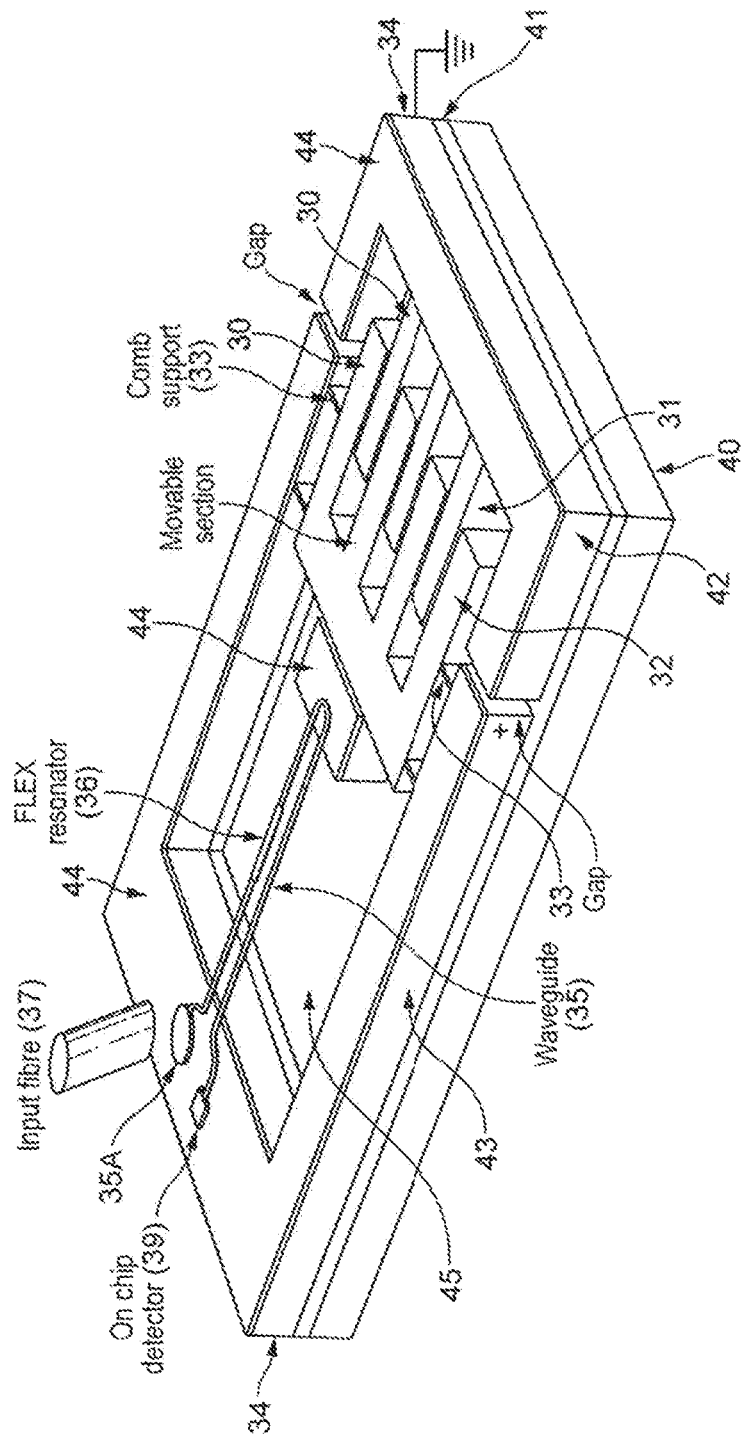
FIG. 12 illustrates an optical apparatus comprising a freely-suspended waveguide of FIG. 1(c) mechanically coupled to a comb drive actuator for applying a tensile force thereto.

Optical gradient force actuation:

The FLEX waveguides are subjected to extremely small optical gradient forces which may induce mechanical movements in the waveguide. Mechanical motion due to pico newton optical gradient forces has been already been demonstrated, in the prior art, in rectangular beam waveguide structures by applying the optical excitation at the beam's mechanical resonance. However, FLEX waveguides, due to their spring geometry and resultant flexibility, will exhibit a much higher sensitivity to optical gradient forces. As FIG. 5(a) and FIG. 5(b) show, the spring constants of the FLEX waveguides are much smaller than those of simple beam waveguides. The spring constant for vertical deflection of a 10 µm FLEX waveguide is about 80 times less than a 10 µm simple silicon beam waveguide. As a result of this enhanced flexibility, a FLEX waveguide (FIG. 11) will undergo proportionally larger deflection amplitudes for the same effective force. Alternatively, this means that optical gradient force phenomena can be detected at much lower optical power levels (and even away from the mechanical resonance frequency). Comb drive actuation:

Reference will now be made to FIG. 12. Practical realization of the FLEX waveguide may include integration of an on-chip, in-plane, large deflection actuator mechanism. Comb drive actuation offers an effective solution for this purpose. Comb drive actuators can provide large in-plane motion (tens of micrometers and above) and large actuation forces (tens of micronewtons), while having the advantage of negligible static holding energy consumption.

In particular, FIG. 12 shows an exemplar application: an integrated FLEX spectrometer chip with integrated comb drive and an on-chip (e.g. photodiode, PIN) photo-detector fabricated in SOSPS platform (Silicon/Oxide/Silicon/Polymer/Silicon).

A comb drive is an electrostatic actuator that may be used to create linear movement of a designated moveable section of the device. Referring to FIG. 12, the device comprises a longitudinal comb-drive (30) including two interdigitated groups of comb fingers (31, 32). A static comb (31) defines a fixed/static group of these comb fingers which is fixed to the body of the device, whereas a moveable comb (32) defines a moveable group (32) of the fingers which are fixed relative to each other (and the moveable comb) but moveable by linear translation relative to the body of the device. The fingers of the moveable comb (32) are interdigitated with the fingers of the fixed comb. The principle of operation is that the fingers of the fixed comb have one charge applied to them (e.g. held at ground potential in this example) and the fingers of the moveable comb have applied to them an opposite charge (e.g. a positive "+" charge in this example). The interdigitated fingers collectively define electrical capacitors. The difference in charges applied to the two combs induces a relative electrostatic force between them which urges the linear translational movement of the moveable comb (32) relative to the static/fixed comb (31).

Mechanical connection between the moveable comb and the body of the device is provided by a two mechanically compliant comb support spring mechanisms (33) which each connect a respective one side of the moveable comb to an adjacent part of the body of the device. The two support spring mechanisms suspend the moveable comb relative to the body of the device. Each comb support spring mechanism possesses a mechanical spring constant, representing the stiffness of the compliant support mechanism. In this way, the moveable comb is mechanically linked to the substrate (34) of the device by the supporting spring mechanisms but is electrically isolated from the static/fixed comb.

Translational motions occur as axial movement in a direction parallel to the longitudinal axis (either direction) of the interdigitated fingers of the two combs. Translational motions can be generated by a comb drive actuator (not shown) arranged to controllably vary the amount of charge ("+") applied to the moveable comb (32), as is depicted in FIG. 12, to vary the electrostatic force exerted by the static comb upon the moveable comb. The amount of movement of the moveable comb, in response to a given change in applied electrostatic force, is determined by the spring constant if the comb support springs which react in response to movement of the moveable comb. The comb structures are generally patterned in conductive material, such as silicon.

The technology for creating these actuators is at a mature stage owing to the huge body of work on electrostatic MEMS devices. Most importantly, the fabrication methods are very compatible with FLEX waveguides fabricated in the SOSPS platform (FIG. 13(b)).

In the device illustrated in FIG. 12, the moveable comb (32) has attached to it an optical waveguide (35) incorporating a FLEX waveguide structure (36) according to the invention. This is connected to a side of the moveable comb opposite to the side from which the fingers of the comb extend. An optical input stricture (35A) is provided/formed on a top surface of the device in optical communication with a terminal optical input end of the optical waveguide. It is adapted for receiving light output from a terminal output end of an optical fibre (37) as an optical input to direct to the optical waveguide (35). The optical input structure (35A) of the device may be an optical input coupler such as a diffraction grating structure, or other suitable structure readily apparent to the skilled person.

An optical output end of the optical waveguide is disposed on a top surface of the device and is optically coupled to a photo-detector (39) adapted for receiving light output from the output end of the optical waveguide (35) as an optical input. In the way, the optical waveguide places the optical input structure (35A) of the device in optical communication with the photo-detector (39) via the FLEX waveguide structure.

The device comprises a silicon handle substrate layer (40) overlaid by an electrical insulating layer (41), which is in turn overlaid by two spaced-apart buried-oxide substrate layers (42, 43). A first of the buried oxide layers (42) is mechanically and electrically connected to the static comb of the device, whereas the second of the buried oxide layers (43) is mechanically and electrically connected to the moveable comb of the device. The first and second buried layers are electrically isolated from the handle substrate layer by the electrical insulating layer, and are electrically isolated from each other by a gap between the two buried layers which prevents mechanical and electrical contact therebetween. This electrically isolates the static comb from the moveable comb.

The first and second buried oxide layers (42, 43) are each, in turn, covered by a respective silicon top layer (44) of the device. A part of the moveable comb is also covered by a corresponding silicon top layer (44). A rectangular trench (45) is cut into the silicon top layers and the underlying first and second buried oxide layers. The walls of the trench are defined by the buried oxide layers and silicon top layers of the device. The static comb and moveable comb both reside within the trench. The input and output ends of the optical waveguide are both disposed upon the silicon top layer of the second buried oxide layer, adjacent each other. The optical waveguide defined a U-turn path away from the location of its input end and subsequently back towards its out put end, via a U-turn bend fixed/disposed upon the corresponding silicon top layer (44) of the moveable comb. This defines two parallel waveguide arms disposed adjacent each other in side-by-side fashion. The Flex waveguide is formed within the waveguide arm emanating from the optical input end of the waveguide, whereas the other waveguide arm provides the return path to the optical output end of the waveguide.

The two waveguide arms extend across the rectangular trench from one short rectangular side of the trench to the opposite rectangular side, in the direction of the longitudinal axis of the trench. The optical waveguide is in the form of a beam waveguide (in cross-section) where it is not a FLEX waveguide structure according to the invention. Thus, the FLEX structure is suspended at its opposite ends above the floor of the trench, between the moveable comb and one opposing edge of the trench.

A tensile strain is controllably applicable to the two parallel waveguide arms, in unison, by actuation of the comb drive/actuator so as to apply a longitudinal stretching force to both, including the FLEX waveguide structure within one of those arms. Changes in the optical properties of light input to the device via the input fibre, which are caused by controlled changes to the properties of the FLEX structure as described above, using the comb drive/actuator, are detectable by the photo-detector.

Fabrication

Due to its excellent material properties, silicon may be considered to be a good choice of material for the FLEX waveguide. In addition to providing the desired optical and mechanical properties, using silicon permits large scale production of these devices. Two different examples of fabrication routes are described herein for use in to building the FLEX waveguide. To create a suspended bridge/beam structures such as may be employed for electrostatic and optical gradient force actuation (FIG. 12), the SOI platform may be used directly (FIG. 13(a): denoted "Process Flow I"). The silicon device layer may be etched (or partially etched, to incorporate electrical contacts) using fluorine based plasma etching. The buried oxide (BOX) layer may be selectively etched using hydrofluoric acid in the vapor or liquid phase to release the FLEX structures. Piezo-drive externally actuated chips (FIG. 11), comb drive actuated chips (FIG. 12) and an accelerometer (FIG. 10) may be fabricated in the multilayer SOSPS platform detailed in FIG. 13(b) (see "Process Flow II").

Figure 13A:
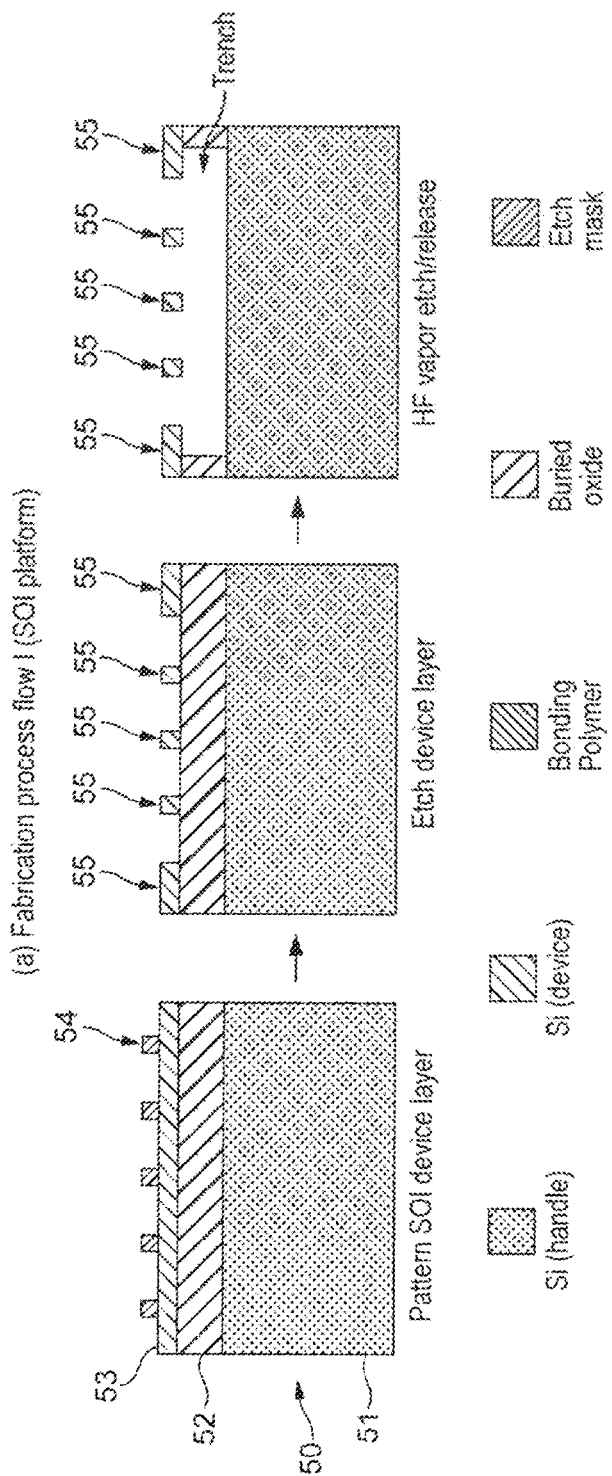
FIG. 13(a) schematically illustrates a process used in the fabrication of FLEX device as in FIG. 11 or FIG. 12.
Figure 13B:
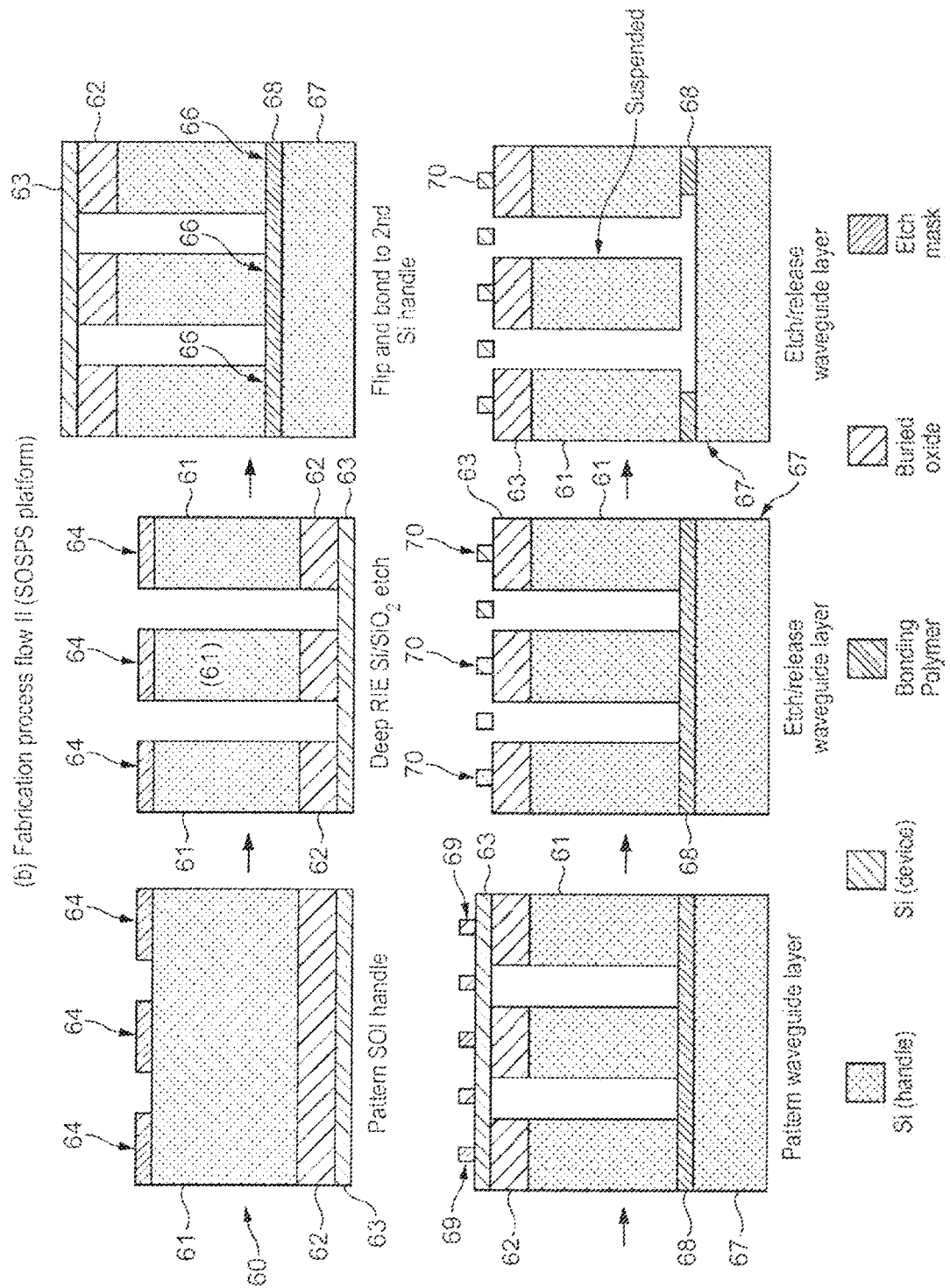
FIG. 13(b) schematically illustrates a process used in the fabrication of a FLEX device as in FIG. 10.
Figure 13C:
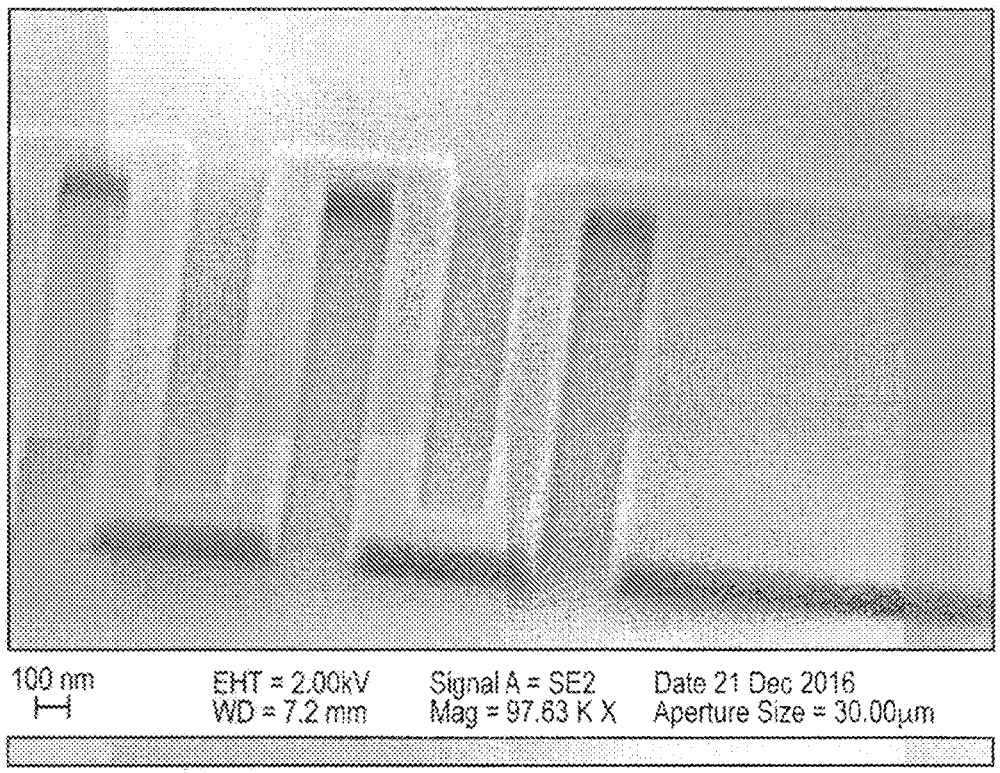
FIG. 13(c) illustrates an image of a waveguide lithography mask of FIG. 1(c) prior to a final etching state implemented to render the waveguide freely suspended.

Reference is now made to FIG. 13, which shows a process for fabricating a FLEX waveguide in a Silicon-on-Insulator (SOI) platform (FIG. 13(a)) and in a SOSPS platform (FIG. 13(b)). FIG. 13(c) shows an electron microscope image of a FLEX waveguide structure in HSQ resist, patterned using electron-beam lithography (scale bar=100 nm, and $\Lambda_G$=400 nm).

Due to the flexibility of the FLEX structures, they may be sensitive to stiction and surface tension forces. To address this, wet hydrofluoric (HF) processing and/or HF acid vapor etching may be used. This step may be done using an HF vapor etching system.

Referring to FIG. 13(a), a process for fabricating a FLEX waveguide device in a an SOI platform (Silicon On Insulator) may comprise the following steps:

(1) Provide a double-side polished SOI chip (50), comprising a silicon handle layer (51) upon which is formed an insulator layer (52) having upon its uppermost surface a silicon layer (53). An etching mask (54) is patterned upon the uppermost surface of the silicon layer;
(2) Etch the silicon layer (53) to define an etched silicon layer (55) of the device. This step may provide the FLEX serpentine waveguide shape;

(3) Etch away the insulator layer (52) at parts underlying the etched parts of the etched silicon layer (55), to form a trench in the insulator layer which reveals at the trench floor the silicon handle layer underlying the insulator layer. A hydrogen flouride (HF) vapour etching process may be used for this step ($SiO_2$+ 4HF→$SiF4$+2 $H_2O$) when the insulator layer is silicon oxide. This provides a suspended FLEX structure as described above.

The macroscale components required for each type of device (e.g., a suspended silicon block, comb drives and the accelerometer proof mass) may be defined and etched into the SOI wafer handle (from the handle side) using a deep RIE etch process. A subsequent oxide plasma etch step may be used to remove the buried oxide, resulting in undercut silicon membranes in designated parts of the chip.

Referring to FIG. 13(*b*), there is schematically shown the fabrication process steps for providing a silicon/oxide/silicon/polymer/silicon (SOSPS) platform, as follows:

(1) Provide a double-side polished SOI chip (60), comprising a silicon handle layer (61) upon which is formed an insulator layer (62) having upon its uppermost surface a silicon layer (63). An etching mask (64) is patterned upon the lowermost surface of the silicon handle layer;

(2) Etch the silicon handle layer (61) and the insulating layer (e.g. $SiO_2$) to reveal the silicon layer (63) in a pattern according to the mask (64). This defines an etched silicon layer (65) of the device.

(3) Remove the etch mask to reveal the un-etched parts (66) of the silicon handle layer. Bond the un-eched parts of the etched silicon handle layer (65) to a second silicon handle layer (67) using e.g. a bonding polymer (68);

(4) Form an etching mask (69) pattern upon the uppermost surface of the silicon layer (63);

(5) Etch the silicon layer (63) to define an etched silicon layer (70) of the device. This step may provide the FLEX serpentine waveguide shape;

(6) Etch away the insulator layer (62) at parts underlying the etched parts of the etched silicon layer (70), to form a trench in the insulator layer which reveals at the trench floor the bonding polymer (68). This provides a suspended FLEX structure as described above;

(7) Etch away the binding polymer (68) layer underlying the parts of the insulator layer intended to be suspended. A deep RIE etch process may be used. This provides a suspended structures (e.g., a suspended silicon block, comb drives and the accelerometer proof mass) as described above.

Figure 14A:
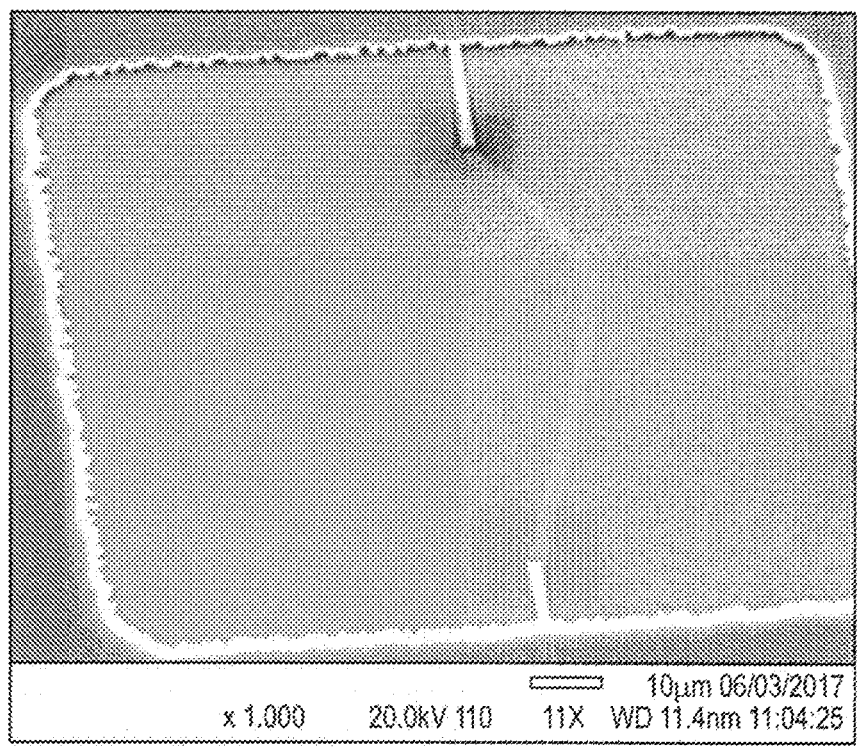
FIG. 14(a) illustrates an image of a waveguide of FIG. 13(c) after a final etching state implemented to release the waveguide from the oxide layer.
Figure 14B:
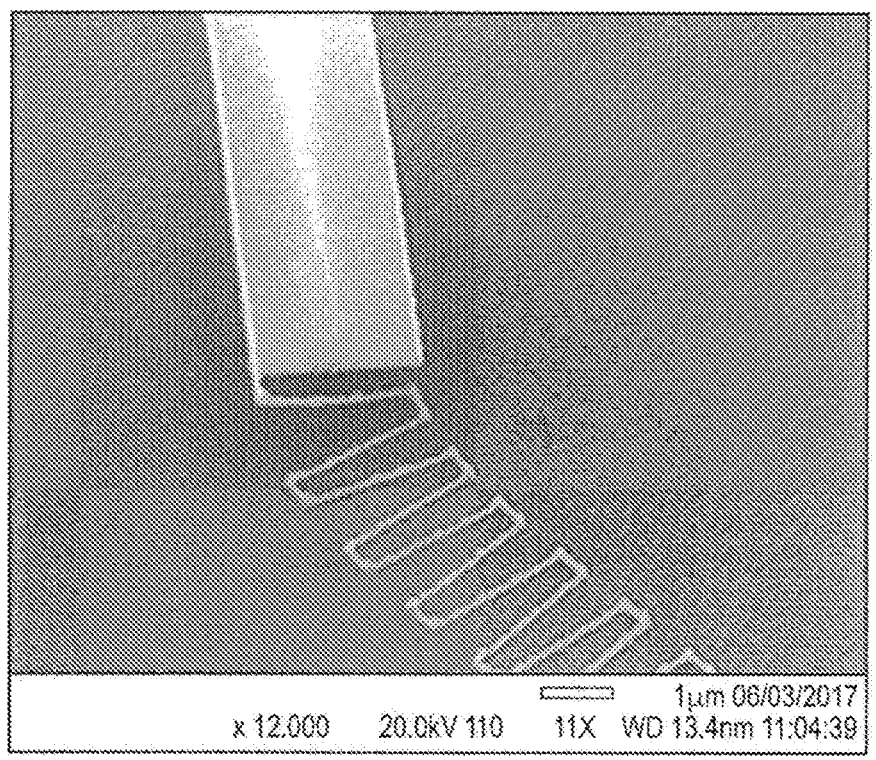
FIG. 14(b) shows a magnified view of FIG. 14(a). The waveguide is in a deflected state and is sticking to the underlying silicon layer.

Thus, the chip may be mounted onto another silicon handle wafer coated with a low-stress thermosetting polymer bonding agent. Bonding may be carried out in the liquid phase (in order to minimize stress and pressure on the etched SOI chip). This results in a hybrid silicon/oxide/silicon/polymer/silicon (SOSPS) platform. The FLEX waveguides, regular waveguides and grating couplers may be patterned on the top device layer of the SOSPS chip using electron beam lithography (FIG. 13(*c*)), followed by silicon plasma etch steps to define and release the FLEX structures. FIG. 14(*a*) shows an example of a FLEX structure once relessed in this way. The scale bar in the image of FIG. 14(*a*) is 10 µm. The scale bar in the zoomed-in image of FIG. 14(*b*) is 1 µm. The integrated FLEX spectrometer (e.g. an application of the device of FIG. 12) may also incorporate an integrated on-chip photo-detector (e.g. photo-diode, PIN detector), which may be fabricated using standard doping and thermal annealing processes. The electron beam lithography step may be replaced with nano-imprint lithography or optical lithography.

A new nanoscale electro-opto-mechanical platform is thereby enabled. This platform may enable a new class of mechanically tunable nano-photonic devices and subsystems which offer greatly improved tuning range while maintaining precision and energy efficiency. Novel switching, sensing and inertial measurement systems are enabled by the invention. The FLEX waveguide may be implemented using silicon or using other material systems such as silicon nitride, nano-crystalline diamond and III-V optical gain materials. The FLEX waveguide may be employed in nano-lasers, nonlinear photonic devices and integrated electro-opto-mechanical chips with broad tunability, operating in the mid- and far-IR regions of the optical spectrum.

Flex Photonic Devices in the Scattering Domain

Figure 2:
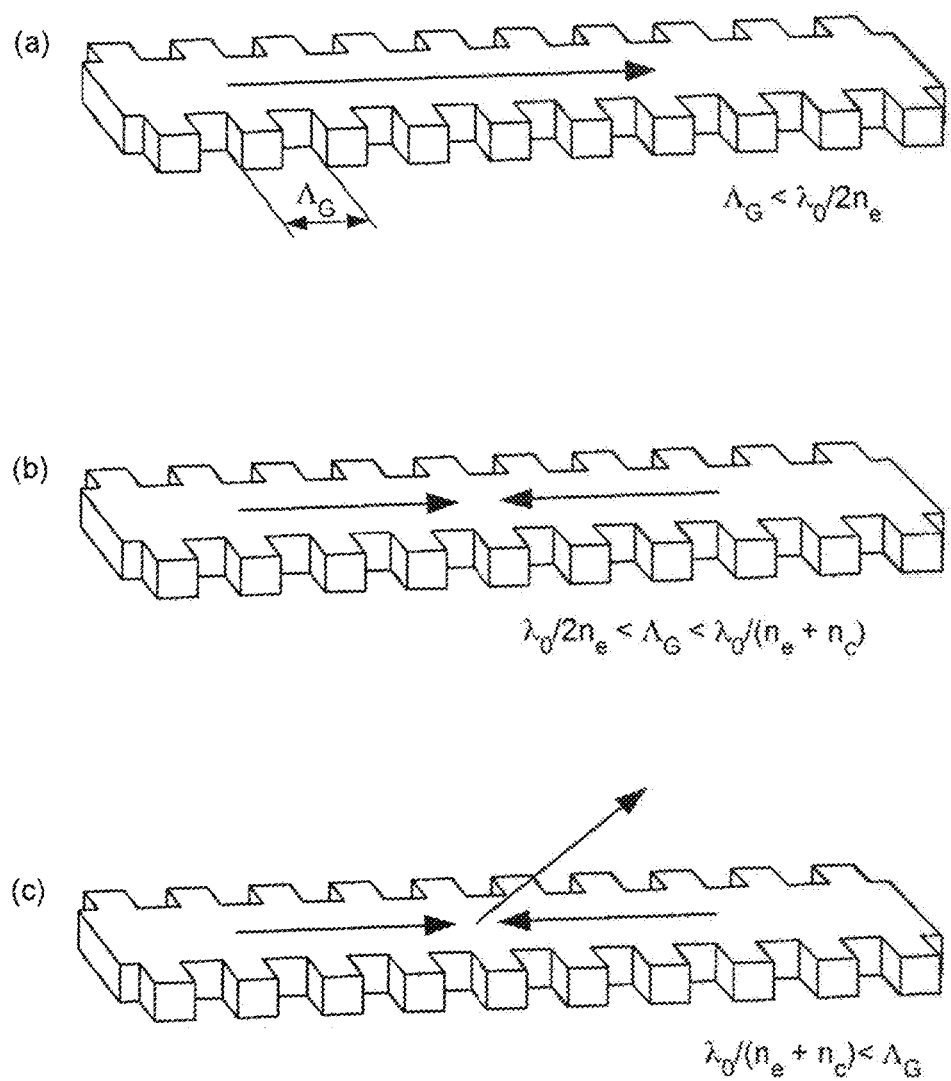
FIG. 2 illustrates the different propagation regimes in a periodic waveguide based on the relative size of the grating period.

The three operating domains (domains (1) to (3)) of the FLEX photonic structures have been summarised above with reference to FIG. 2.

In Domain (3) the guided wave can be scattered into free space and the scattering angle can be controlled by elongating the structure. The strength of scattering can be controlled using scattering 'stubs'. Domains (1) and (3) can be combined by placement of stubs with a period that is in Domain (3) on top of a FLEX waveguide operating in Domain (1). This concept can be extended to surfaces rather than a single waveguide by placing FLEX waveguides in close proximity (and even connecting them using lateral links). This metasurface may be deformed mechanically. We can place other structures such as dielectric (transparent) lines and feed the whole structure using a single laser.

By pulling on this membrane, the period of the lines changes, resulting a steered beam. Alternatively, the lines can be made of metal and the structure will now act as a free space reflective grating (see FIG. 15). This will allow grating period change, while taking advantage of the desirable mechanical properties of silicon (which, unlike metal, does not undergo plastic deformation). Note that due to symmetries, the metal lines are not subjected to stress/strain forces. These types of FLEX structures can be used in LIDAR applications. In principle any application that traditionally uses a moving grating can use the FLEX structure instead (for example an external cavity tunable laser).

Figure 15:
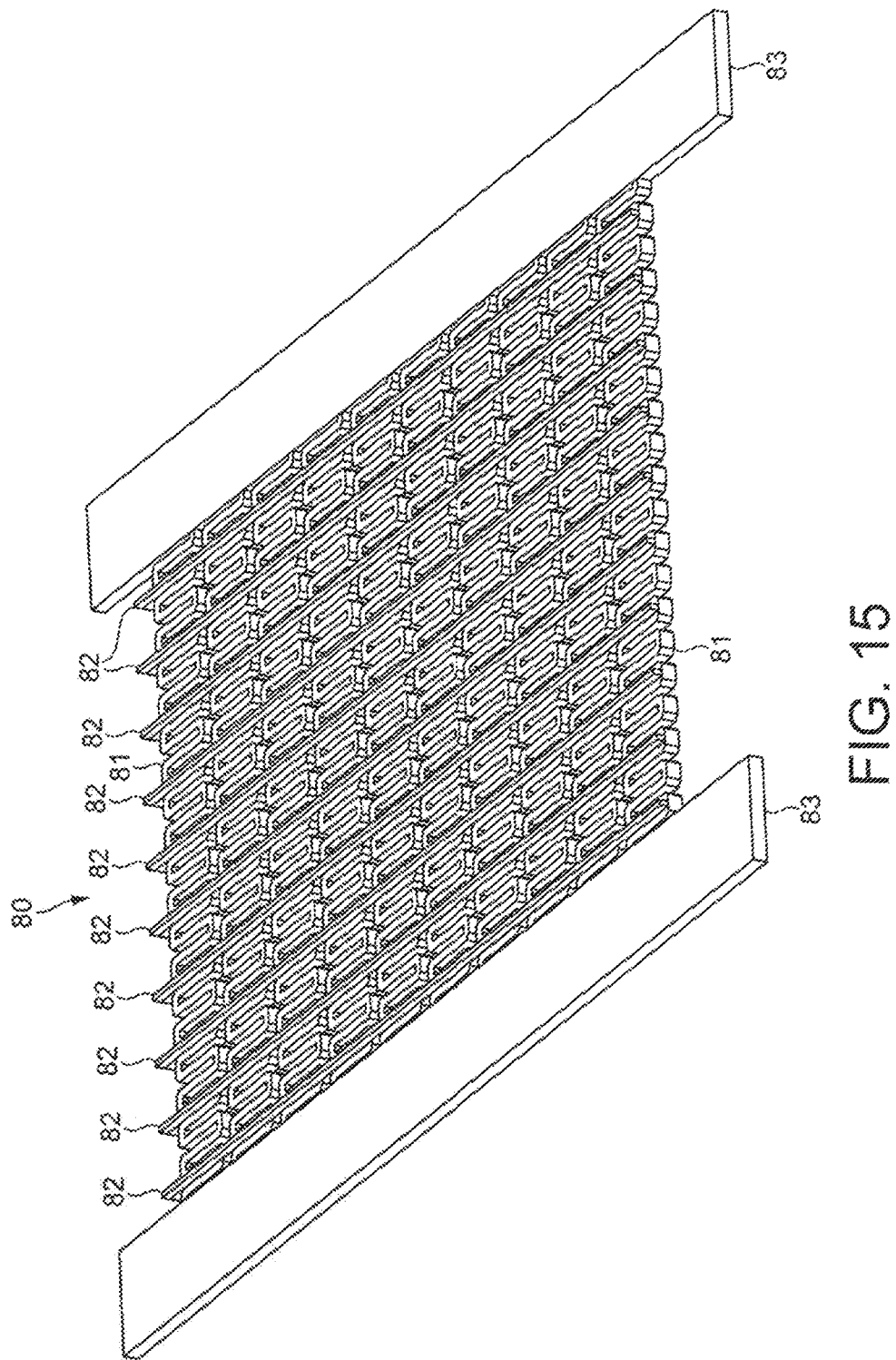
FIG. 15 illustrates a beam-forming apparatus comprising plurality of waveguides of FIG. 1(c) arranged in parallel, side-by-side, to define a planar array, and comprising a plurality of tuning stubs arranged along the array with each tuning stub extending in across all of the waveguides within the planar array to serve as a tuning stub common to all, resulting in a tuneable pitch grating.

In particular, with reference to FIG. 15, there is illustrated a planar array (80) of ten separate, successive and neighbouring FLEX waveguides (81) disposed side-by-side with their longitudinal axes arranged mutually in parallel in one common plane, and equally spaced neighbour-to-neighbour. Terminal ends of the ten waveguides are connected in common to transverse end-bars (83) at respective opposite ends of the waveguides. One or each of these end-bars may be coupled to an actuator (not shown) operable to apply a linear movement in a direction along the longitudinal axes of the waveguides, in the plane of the array, to put effect to the strain-dependent properties of the/each FLEX waveguide as described above.

The planes of the meanders of each of the FLEX waveguide are mutually coplanar. The FLEX waveguides of this array are substantially identical in structure and form. Each meander in each of the FLEX waveguides of this array is aligned in phase with a corresponding meander of each of the other FLEX waveguides of the array. Ten linear coupling bars (82) extend across one common surface of the planar array (80) in a direction perpendicular to the longitudinal axes of the FLEX waveguides.

Each coupling bar is separately connected to each one of the ten separate, corresponding meanders in common, neighbour-to-neighbour, to couple the ten FLEX waveguides together at mutually in-phase meanders of the ten FLEX waveguides. The linear coupling bars are equally spaced, neighbour-to-neighbour, by a spacing common to all neighbouring coupling bars. That spacing is equal to two meander lengths of the FLEX waveguide structure. Each of the ten coupling bars provides to each of the ten FLEX waveguides a waveguide stub to induce the output of guided light from the FLEX waveguides in a direction transverse to the plane of the array (80). This provides a radiating surface able to output beam of light having a 2-dimensional cross-sectional area defined by the surface are of the array.

Plasmonic FLEX Waveguides and Devices

In addition to dielectric waveguides, another embodiment of the invention provides a waveguide made from a metal. In the prior art, the most common form of metallic waveguide is a hollow metallic waveguide prevalent in microwave transmission technology (e.g. with or within antenna systems etc.). In the optical domain however, due to the proximity of the optical frequencies to the plasma frequency of the domain, another group of guided modes exist, termed surface plasmon modes or surface plasmon polaritons. In these modes, an optical wave is guided at the boundary of metal and the adjacent dielectric medium. This is done through coupling of the optical field with fluctuations in the electron density of the metal. These surface waves are somewhat similar to waves on the surface of a body of water.

The preferred metals for use as such waveguides in the optical domain include gold, silver, and aluminium etc., but even for these metals the propagation length of such modes (at telecommunication wavelengths) is a few hundred microns or less. However, if a thin (20 nanometers approx.) strip is provided with a width of a few microns (see FIG. 16) using one of these preferred metals is created, the plasmonic modes on each side of the strip will couple and interact, leading to a superposition of modes. In particular, one of these new modes will have very little overlap with the metal while still being bound and guided by the strip. As a result, the propagation length of such a waveguide can be of the order of millimeters. Due to this relatively large increase in propagation distance these modes are known in the art as "long range surface plasmon polariton" (LRSPP) modes.

Figure 16:
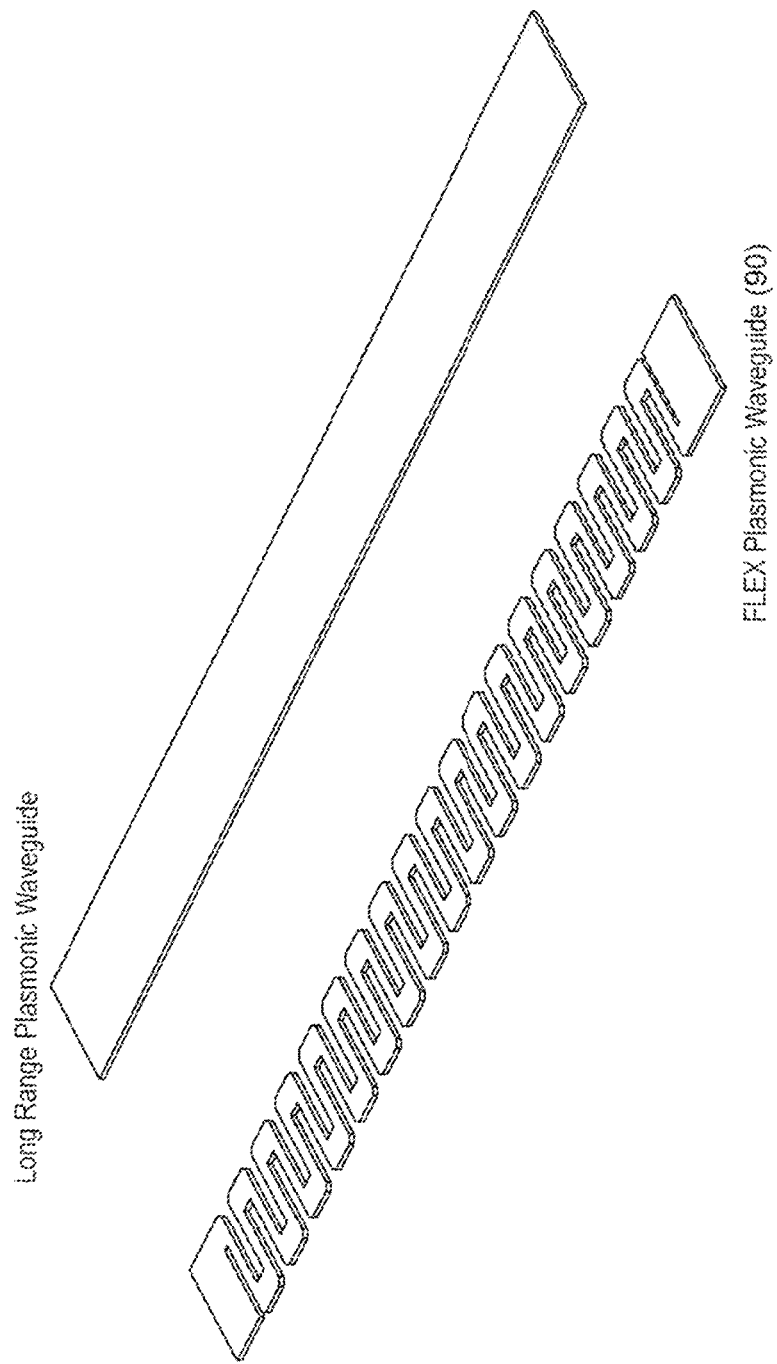
FIG. 16 illustrates a plasmonic waveguide comprising a serpentine spring, shown next to a long-range plasmonic waveguide of the prior art, for comparison.

A FLEX waveguide (90) may be provided as an LRSPP waveguide as is illustrated in FIG. 16. This may be done by forming a periodic spring structure in the metal strip (e.g. nanospring, having spring period dimensions such as described above). Such a spring structure has been found to guide LRSPP modes while also being mechanically tunable, in the same way that a silicon FLEX waveguide structure such as described above. The new FLEX waveguide structure for LRSPP modes has the advantage of being extremely thin, and may have e strip thickness of less than 100 nm, or less than 80 nm, or less than 60 nm, or less than 40 nm, such as 20 nm or less.

Since the spring constant (k) of a rectangular beam spring is approximately proportional to the thickness (T) to the power of three (i.e. $k \sim T^3$), a metallic spring of this type is sensitive to much smaller applied forces. In addition Young's constant for a metal suitable for this FLEX waveguide is about 1/3 that of silicon. This contributes to an even smaller spring constant.

Although a few preferred embodiments of the present invention have been shown and described, it will be appreciated by those skilled in the art that various changes and modifications might be made without departing from the scope of the invention, as defined in the appended claims.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An optical waveguide apparatus for guiding optical radiation therein, comprising:
    a serpentine spring defining an optical grating structure via a plurality of spring periods which together form the serpentine spring, the optical grating structure thereby having a grating period with the same period as the spring period which is mechanically variable to control the Bloch-mode effective refractive index of, and/or optical path length in, at least a part of the optical waveguide in respect to optical radiation guided across the spring periods along the optical waveguide.

2. An optical waveguide apparatus according to claim 1 including an actuator arranged to mechanically apply to the spring any one or more of:
    a strain;
    a flexure;
    a torsion;
thereby to vary the grating period, and/or the optical path length, along at least a part of the optical waveguide.

3. An optical waveguide apparatus according to claim 2 in which the actuator is arranged to mechanically apply to the spring any one or more of:
    a compressive strain;
    a tensile strain;
    a torsional strain.

4. An optical waveguide apparatus according to claim 2 in which the actuator is arranged to apply said strain to elongate the spring or to compress the spring thereby to increase or decrease, respectively, the effective optical path length of said Bloch mode.

5. An optical waveguide apparatus according to claim 2 in which said actuator is arranged to apply said strain controlled to be a strain value not greater than the value of the corresponding ultimate strain of the spring.

6. An optical waveguide apparatus according to claim 1 in which the fracture strain of the spring has a value of at least 0.1% or at least 0.5%.

7. An optical waveguide apparatus according to claim 6 in which the fracture strain of the spring has a value in the range 1% to 25%.

8. An optical waveguide apparatus according to claim 1 in which the Young's modulus of the material of the spring is less than 1200 GPa.

9. An optical waveguide apparatus according to claim 1 in which the value of the grating period is a value between 1 nm and 100 µm.

10. An optical waveguide apparatus according to claim 1 in which the width of the spring wire, along the dimension of the spring parallel to the longitudinal axis of the waveguide, does not exceed 15 µm.

11. An optical waveguide apparatus according to claim 1 in which the height of the spring wire, along the dimension of the spring transverse to the longitudinal axis of the waveguide, does not exceed 15 µm.

12. An optical waveguide apparatus according to claim 1 in which the width of the waveguide does not exceed 10 µm.

13. An optical waveguide apparatus according to claim 1 in which the spring is formed from a material which is a substantially brittle material whereby the ultimate strength of the spring is substantially equal to the breaking strength of the spring.

14. An optical waveguide apparatus according to claim 1 in which the spring is formed from a crystal or polycrystalline material or a polymer or a plasmonic metal.

15. An optical waveguide apparatus according to claim 1 in which the spring is formed from a semiconductor material.

16. An optical waveguide apparatus according to claim 1 in which each spring period comprises a rectangular meander path in the spring.

17. An optical waveguide apparatus according to claim 1 in which each spring period comprises a meander having a meander length along the longitudinal axis of the spring, and a meander width transverse to the longitudinal axis of the spring, whereby substantially linear span beam segments span the meander width and substantially linear connector beam segments connect successive span beam segments along the meander length.

18. An optical waveguide apparatus according to claim 17 in which span beam segments meet connector beam segments to define a convex corner, wherein the convex meander corner which is filleted.

19. An optical waveguide accordingly to claim 17 wherein the Bloch modes of the guided light within the optical waveguide travel along a longitudinal axis of the spring so as to pass directly across successive transverse spring meanders and directly across spaces between transverse spring meanders.

20. An optical waveguide apparatus according to claim 1 in which the spring is planar and each grating period lies substantially in the plane of the waveguide.

21. An optical waveguide apparatus according to claim 1 in which the spring comprises a plurality of tuning stubs.

22. An optical waveguide apparatus according to claim 21 in which the tuning stubs vary in length along the axial length of the spring to control the distribution of light radiated from the waveguide along the length of the spring.

23. An optical waveguide apparatus according to claim 1 in which grating period changes along at least a part of the axial length of spring thereby to produce chirped grating structure.

24. An optical waveguide apparatus according to claim 1 including a tuning controller arranged to control the value of the grating period to control the spectral position of a photonic band gap of the optical waveguide.

25. An optical waveguide apparatus including a plurality of said waveguides apparatus according to claim 1, in which two or more of the plurality of waveguides are mutually optically coupled.

26. An optical phase modulator comprising an optical waveguide apparatus according to claim 1.

27. An optical dispersion compensator comprising an optical waveguide apparatus according to claim 1.

28. An optical spectrometer comprising an optical waveguide apparatus according to claim 1.

29. An optical beam former comprising an optical waveguide apparatus according to claim 1.

30. An optical beam former comprising a plurality of optical waveguide apparatuses according to claim 1 in which a plurality of said springs are arranged successively side-by-side with respective longitudinal axes mutually in parallel and substantially coplanar to define a substantially planar array of said springs.

31. An optical beam former according to claim 30 comprising a plurality of tuning stubs, in which at least one tuning stub spans the planar array so as to be a tuning stub common to at least two successive said side-by-side springs thereby to define an optically radiating planar array.

32. An optical interferometer comprising an optical waveguide apparatus according to claim 1.

33. A tuneable Bragg grating comprising an optical waveguide apparatus according to claim 1.

34. A directional optical coupler comprising an optical waveguide apparatus according to claim 1.

35. An accelerometer comprising an optical waveguide apparatus according to claim 1.

36. An optical waveguide according to claim 1 wherein the Bloch modes of the guided light within the optical waveguide travel along a longitudinal axis of the spring so as to pass directly across successive transverse spring meanders and directly across spaces between transverse spring meanders.

37. A plasmonic waveguide apparatus for guiding surface plasmons thereon, comprising:
a serpentine spring made from plasmonic material, the serpentine spring defining an optical grating structure via a plurality of spring periods which together form the serpentine spring, the optical grating structure thereby having a grating period with the same period as the spring period which is mechanically variable to control the Bloch-mode effective refractive index of, and/or optical path length in, at least a part of the plasmonic waveguide in respect of a given frequency of surface plasmon guided across the spring periods along the optical waveguide.

* * * * *